(12) United States Patent
Ito et al.

(10) Patent No.: US 9,950,417 B2
(45) Date of Patent: Apr. 24, 2018

(54) POWER TOOL

(75) Inventors: Yutaka Ito, Hitachinaka (JP);
Katsuhiro Oomori, Hitachinaka (JP);
Mizuho Nakamura, Hitachinaka (JP);
Tomomasa Nishikawa, Hitachinaka (JP); Hironori Mashiko, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 664 days.

(21) Appl. No.: 13/496,846

(22) PCT Filed: Mar. 29, 2011

(86) PCT No.: PCT/JP2011/058480
§ 371 (c)(1),
(2), (4) Date: May 24, 2012

(87) PCT Pub. No.: WO2011/122695
PCT Pub. Date: Oct. 6, 2011

(65) Prior Publication Data
US 2013/0014967 A1    Jan. 17, 2013

(30) Foreign Application Priority Data

Mar. 31, 2010  (JP) .................................. 2010-083749
May 31, 2010   (JP) .................................. 2010-125376

(51) Int. Cl.
*B25D 15/02*       (2006.01)
*H02P 6/06*        (2006.01)
(Continued)

(52) U.S. Cl.
CPC ................ *B25F 5/00* (2013.01); *B25F 5/021* (2013.01); *H02P 6/06* (2013.01)

(58) Field of Classification Search
CPC ...... H02P 6/06; H02P 6/08; B25F 5/00; B25F 5/01; B25D 2250/131; B25B 23/147; B25B 23/1475; B25B 21/008
(Continued)

(56) References Cited

U.S. PATENT DOCUMENTS 3,896,914 A * 7/1975 Konsbruck ........... B60W 10/08
                                                  318/10
3,974,685 A * 8/1976 Walker ................ B25B 23/1456
                                                  173/182
(Continued)

FOREIGN PATENT DOCUMENTS

CN   101372095 A   2/2009
CN   101391416 A   3/2009
(Continued)

OTHER PUBLICATIONS

International Search Report for application PCT/JP2011/058480 (dated Aug. 9, 2011).
(Continued)

*Primary Examiner* — Stephen F Gerrity
*Assistant Examiner* — Joshua Kotis
(74) *Attorney, Agent, or Firm* — Kilpatrick Townsend & Stockton LLP

(57) ABSTRACT

An electronic pulse driver includes a motor, a hammer, an anvil, an end tool mounting unit, a power supply unit, and a control unit. The hammer is rotatable together with the anvil. The end tool mounting unit transmits the rotation of the anvil to an end tool. The power supply unit supplies a drive electric power to the motor. The control unit controls the power supply unit to halt a supply of the drive electric power to the motor when an electric current flowing to the motor increases to a prescribed value. The control unit controls the power supply unit to supply to the motor a
(Continued)

prestart electric power lower than the drive electric power before supplying the drive electric power in order to permit the power supply unit to supply the drive electric power after the hammer is in contact with the anvil.

4 Claims, 24 Drawing Sheets

(51) Int. Cl.
  *B25F 5/00* (2006.01)
  *B25F 5/02* (2006.01)
(58) Field of Classification Search
  USPC ... 173/1–11, 15, 90, 93, 170, 176, 179, 217, 173/180, 181; 318/430–434
  See application file for complete search history.

(56) References Cited

U.S. PATENT DOCUMENTS

| | | | | |
|---|---|---|---|---|
| 4,185,701 A * | 1/1980 | Boys | B25B 23/1456 | 173/183 |
| 4,273,198 A * | 6/1981 | Doniwa | B25B 23/147 | 173/1 |
| 5,156,221 A * | 10/1992 | Breitenmoser | B25B 23/147 | 173/1 |
| 5,457,866 A * | 10/1995 | Noda | B25B 21/026 | 173/183 |
| 5,563,482 A * | 10/1996 | Shaw | B25B 23/147 | 173/176 |
| 5,731,673 A * | 3/1998 | Gilmore | B23P 19/066 | 173/178 |
| 5,738,177 A * | 4/1998 | Schell | B25B 23/14 | 173/178 |
| 6,371,218 B1 * | 4/2002 | Amano | B25B 23/1405 | 173/176 |
| 6,539,603 B1 * | 4/2003 | Bulow | B23P 19/066 | 173/180 |
| 6,598,684 B2 * | 7/2003 | Watanabe | B25B 23/1405 | 173/176 |
| 6,741,051 B2 * | 5/2004 | Chu | H02P 7/29 | 173/104 |
| 6,873,124 B2 * | 3/2005 | Kawano | H02P 7/29 | 318/244 |
| 7,235,940 B2 * | 6/2007 | Bosch | H02P 7/28 | 173/4 |
| 7,320,368 B2 * | 1/2008 | Watanabe | | 173/48 |
| 7,334,648 B2 * | 2/2008 | Arimura | B25B 21/02 | 173/176 |
| 7,882,899 B2 | 2/2011 | Borinato et al. | | |
| 7,882,900 B2 | 2/2011 | Borinato et al. | | |
| 8,067,913 B2 | 11/2011 | Watabe et al. | | |
| 8,074,731 B2 | 12/2011 | Iwata et al. | | |
| 8,084,901 B2 | 12/2011 | Oomori et al. | | |
| 8,179,069 B2 | 5/2012 | Matsunaga et al. | | |
| 2003/0221928 A1 * | 12/2003 | Koslowski | B25F 5/001 | 192/48.2 |
| 2004/0200628 A1 * | 10/2004 | Schmitzer | B25D 16/006 | 173/1 |
| 2005/0263303 A1 * | 12/2005 | Shimizu | B25B 23/1475 | 173/2 |
| 2007/0187125 A1 * | 8/2007 | Sterling | B25B 21/02 | 173/162.1 |
| 2009/0014192 A1 * | 1/2009 | Ito | B23P 19/066 | 173/1 |
| 2009/0051306 A1 * | 2/2009 | Matsunaga | H02P 6/08 | 318/434 |
| 2009/0071671 A1 * | 3/2009 | Zhong | B23B 45/008 | 173/176 |
| 2009/0096401 A1 * | 4/2009 | Watabe | B25F 5/00 | 318/446 |
| 2010/0059240 A1 * | 3/2010 | Schmidt | B25B 23/14 | 173/1 |
| 2010/0089600 A1 * | 4/2010 | Borinato | B23P 19/066 | 173/1 |
| 2010/0175903 A1 * | 7/2010 | Ikuta | B25D 11/125 | 173/2 |
| 2010/0200260 A1 * | 8/2010 | Mikami et al. | | 173/176 |
| 2010/0263890 A1 * | 10/2010 | Profunser | B25B 21/02 | 173/1 |
| 2010/0307782 A1 * | 12/2010 | Iwata et al. | | 173/1 |
| 2011/0073334 A1 * | 3/2011 | Iimura | B25B 21/02 | 173/2 |
| 2011/0162861 A1 | 7/2011 | Borinato et al. | | |
| 2011/0284255 A1 * | 11/2011 | Ookubo | B23B 45/02 | 173/109 |
| 2011/0284256 A1 * | 11/2011 | Iwata | | 173/176 |
| 2011/0315417 A1 * | 12/2011 | Matsunaga | B25B 21/008 | 173/176 |
| 2012/0279736 A1 * | 11/2012 | Tanimoto | B25B 21/02 | 173/2 |

FOREIGN PATENT DOCUMENTS

| | | | | |
|---|---|---|---|---|
| CN | 101516575 A | 8/2009 | | |
| EP | 0729211 | 8/1996 | | |
| EP | 0729211 A2 * | 8/1996 | | H02J 7/02 |
| EP | 0729211 A2 * | 8/1996 | | B23D 47/12 |
| EP | 0808018 A1 * | 11/1997 | | H02P 7/29 |
| EP | 2039479 | 3/2009 | | |
| JP | 2007-007784 A | 1/2007 | | |
| JP | 2008-307664 | 12/2008 | | |
| JP | 2009-056590 A | 3/2009 | | |
| JP | 2009-072889 A | 4/2009 | | |
| JP | 2009-078349 A | 4/2009 | | |
| WO | WO2009/102082 A2 | 8/2009 | | |
| WO | WO 2010087206 A1 * | 8/2010 | | B23B 45/02 |

OTHER PUBLICATIONS

China Intellectual Property Office office action for application CN201180010695.6 dated May 4, 2014.
International Report on Patentability for application PCT/JP2011/058480 (dated Oct. 11, 2012).
Japan Patent Office office action for patent application JP2010-083749 (dated Oct. 24, 2013).

\* cited by examiner

FIG.3
(1)
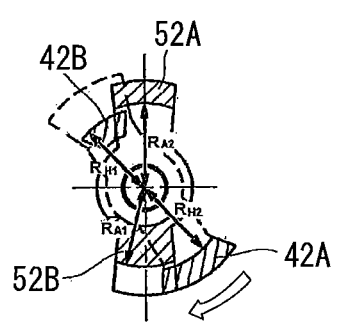
(2)
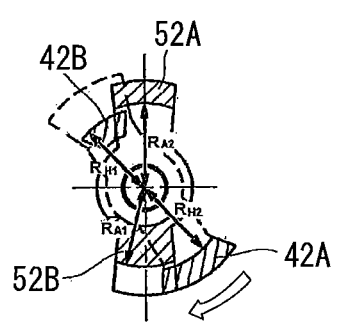
(3)
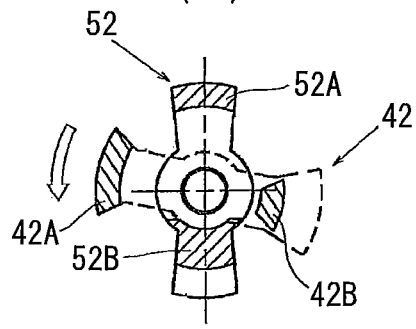
(4)
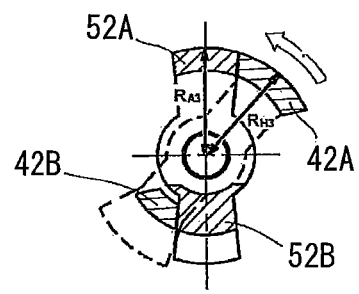
(5)
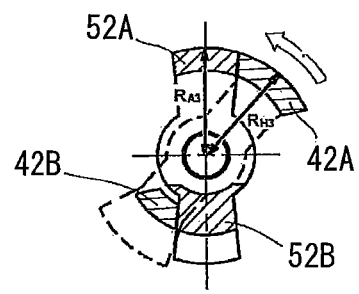
(6)
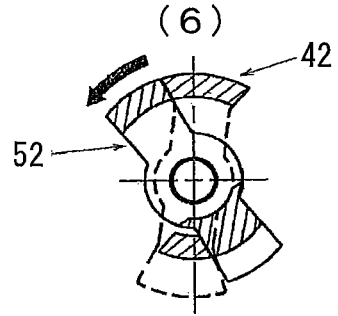

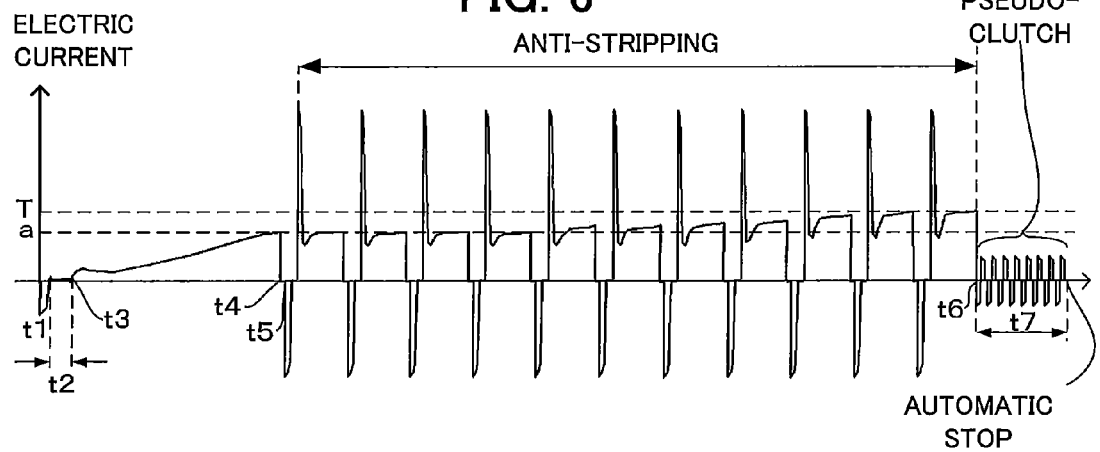
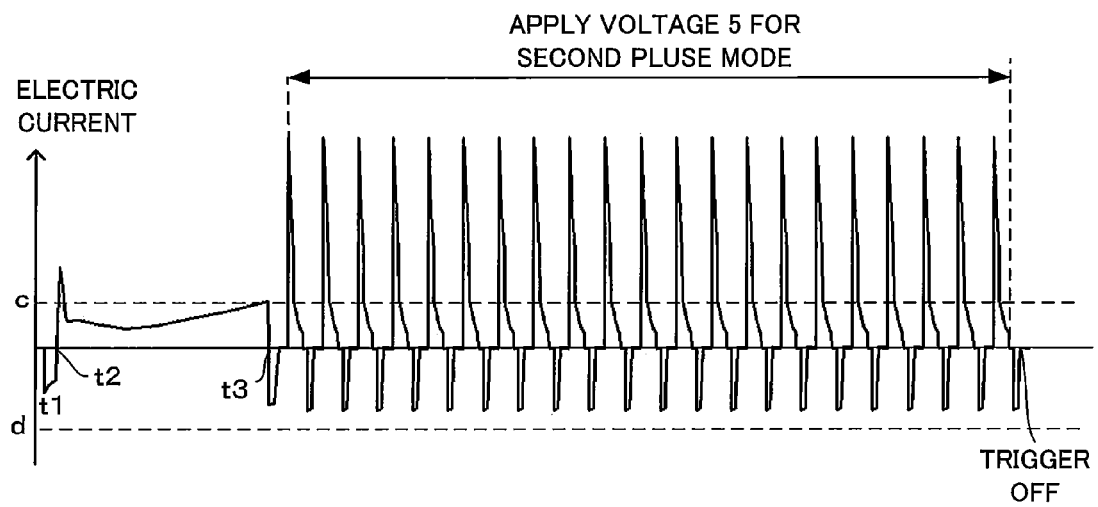

FIG.22
(1)
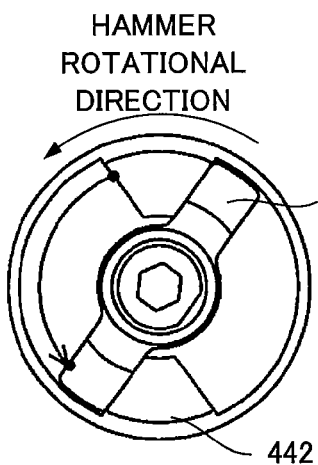
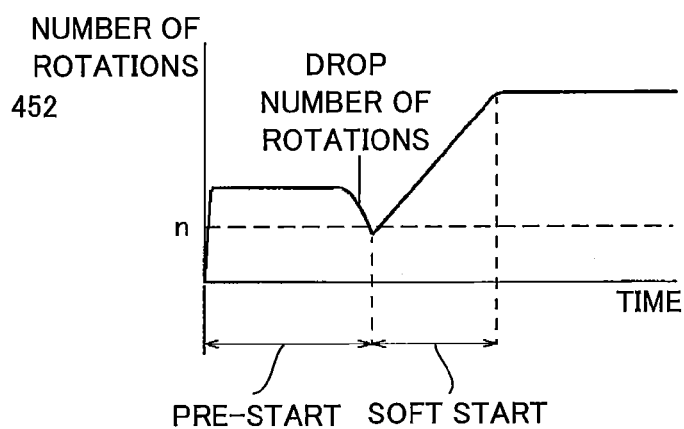
(2)
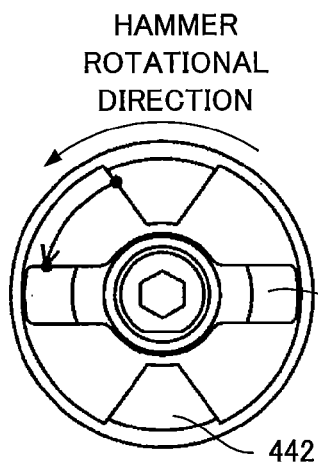
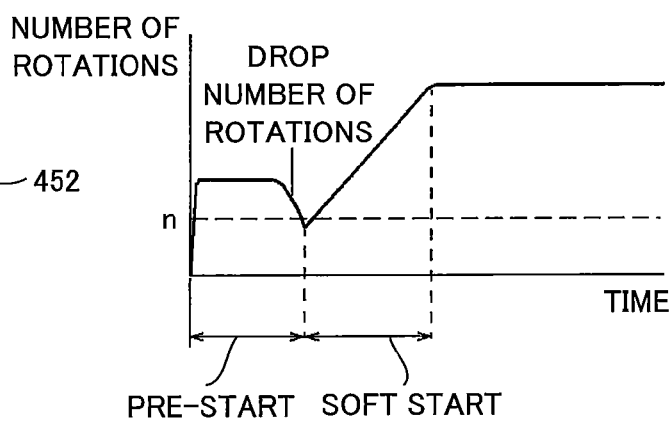
(3)
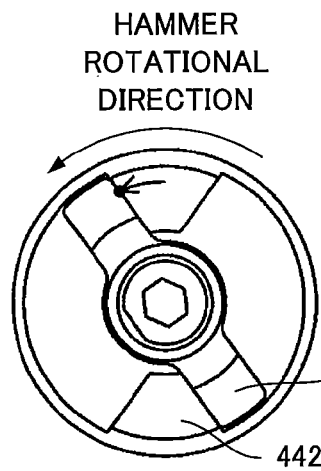
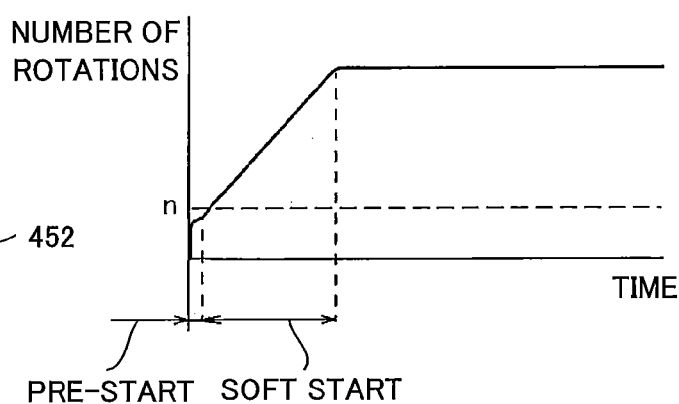

FIG.25
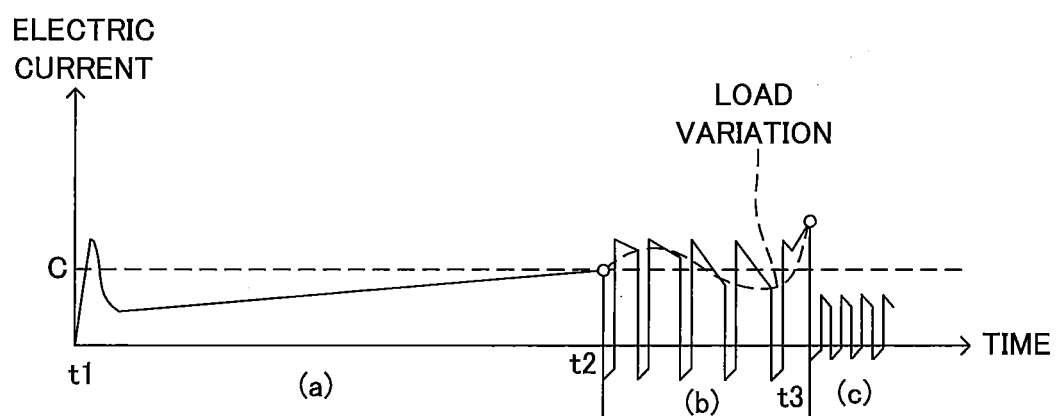
(1)
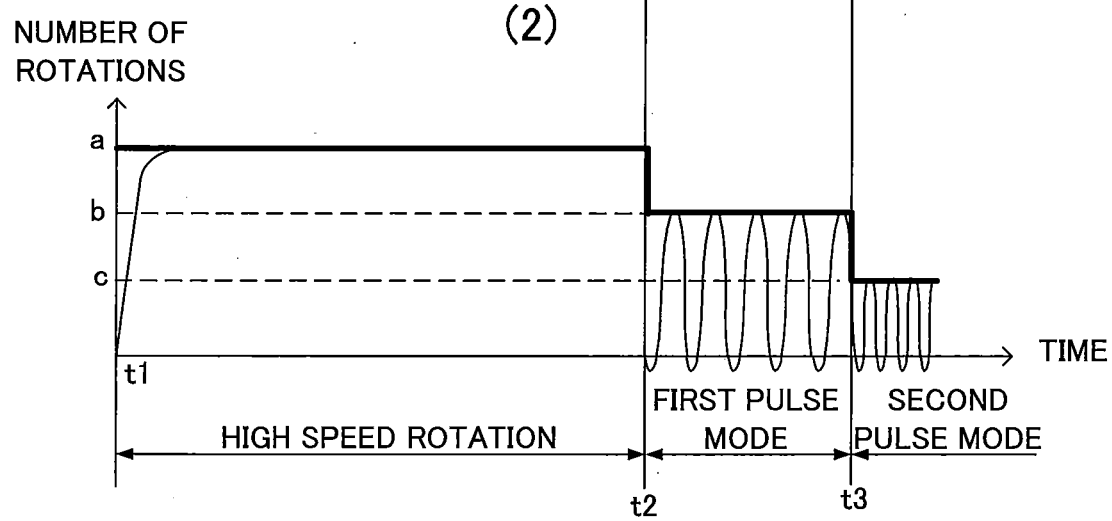
(2)

FIG.27
(1) FORWARD ROTATION
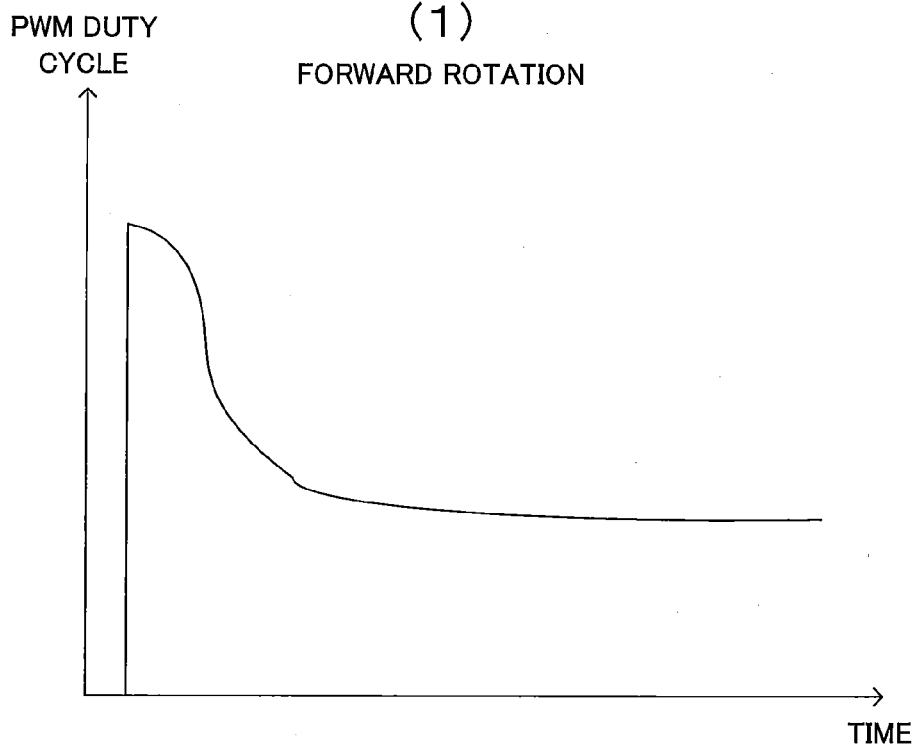
(2) REVERSE ROTATION
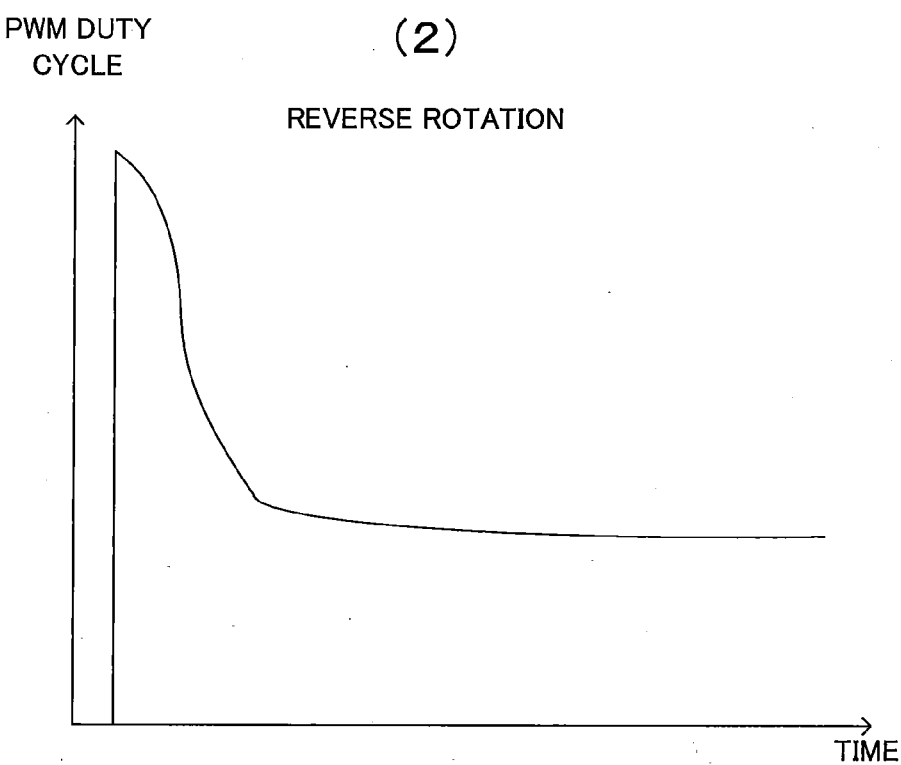

POWER TOOL

CROSS REFERENCE TO RELATED APPLICATION

This application claims priority from Japanese Patent Application No. 2010-083749 filed Mar. 31, 2010 and Japanese Patent Application No. 2010-125376 filed May 31, 2010. The entire contents of each of these priority applications are incorporated herein by reference.

TECHNICAL FIELD

The present invention relates to a power tool and an electric power tool, and particularly to an electronic pulse driver that outputs a rotary drive force.

BACKGROUND ART

A conventional power tool primarily includes a motor, a hammer drivingly rotated by the motor, and an anvil. The hammer collides with the anvil and imparts torque thereto. The torque provided to the anvil is transmitted to an end tool for tightening a screw or performing another fastening operation. In this type of power tool, the torque applied to the anvil and transmitted to the end tool is generated by the impact between an engaging protrusion provided on the hammer and an engagement protrusion provided on the anvil.

CITATION LIST

Patent Literature

PLT1: Japanese Patent Application Publication No. 2008-307664

SUMMARY OF INVENTION

Technical Problem

However, in the conventional power tool, the engaging protrusion provided on the hammer strikes the engagement protrusion of the anvil at a high rate of speed generated by the motor. Consequently, the force of impact between the engaging protrusion and the engagement protrusion increases, increasing the tightening torque. This is particularly problematic when the screw or the like has already been tightened. A torque for retightening the screw may excessively become too large because the tightening torque has already been applied to the screw as the torque generated by impact between the engaging protrusion and the engagement protrusion.

Further, after the power tool tightens a fastener, the power tool is unable to loosen the fastener with the same torque used to tighten the fastener due to a coefficient of static friction between the fastener and a workpiece being larger than a coefficient of kinetic friction. Thus, the operator must adjust the torque setting, making the driver less user-friendly to operate.

Solution to Problem

It is an object of the present invention to provide a power tool, an electric power tool, and an electronic pulse driver capable of preventing torque exceeding a target torque from being transferred to the fastener.

Another object of the present invention is to provide an electric power tool having superior operability while reducing unnecessary wait time before fastening operations.

This and other objects of the present invention will be attained by an electronic pulse driver. The electronic pulse driver includes a motor, a hammer, an anvil, an end tool mounting unit, a power supply unit, and a control unit. The hammer is drivingly rotated by the motor. The anvil is provided separately from the hammer and rotatable together with the hammer by the rotation of the hammer. The end tool mounting unit mounts thereon an end tool and transmits the rotation of the anvil to the end tool. The power supply unit supplies a drive electric power to the motor. The control unit controls the power supply unit to halt a supply of the drive electric power to the motor when an electric current flowing to the motor increases to a prescribed value. The control unit controls the power supply unit to supply to the motor a prestart electric power lower than the drive electric power before supplying the drive electric power in order to permit the power supply unit to supply the drive electric power after the hammer is in contact with the anvil.

With this construction, a large force of impact is not generated by the collision between the hammer and the anvil when the prestart electric power lower than the drive electric power is applied to the hammer. Therefore, the impact between the hammer and the anvil does not produce an excessive large torque and, hence, the end tool is less likely to tighten the fastener with a torque greater than a target torque.

According to another aspect, the present invention provides a power tool. The power tool includes a motor as a drive source, a hammer, and an anvil. The hammer is connected to the motor and rotatable by the motor, the motor supplying one of a first drive force and a second drive force smaller than the first drive force to the hammer. The anvil is rotatable relative to the hammer. The hammer and the anvil are integrally rotated when the first drive force is supplied to the hammer. The motor supplies the second drive force at an initial activation state of the motor and then supplies the first drive force after supplying the second drive force.

With this construction, a large force of impact is not generated by the collision between the hammer and the anvil when the second drive force lower than the first drive force is applied to the hammer. Therefore, the impact between the hammer and the anvil does not produce an excessive large torque and, hence, the end tool is less likely to tighten the fastener with a torque greater than the target torque.

It is preferable that the power tool further includes a trigger providing a stroke, and the first drive force is changeable based on an amount of the stroke, and the second drive force is smaller than a predetermined value and maintains a constant level regardless of the moving stroke.

According to still another aspect, the present invention provides an electric power tool. The electric power tool includes an electrical motor, a hammer, an anvil, and a power supply unit. The hammer is drivingly connected to the electrical motor. The anvil is rotatable relative to the hammer. The power supply unit selectively supplies to the motor one of a first electric power and a second electric power smaller than the first electric power. The power supply unit is configured to supply the second electric power at an initial activation state of the electrical motor and to supply the first electric power after supplying the second electric power.

With this construction, a large force of impact is not generated by the collision between the hammer and the anvil when the second electric power (a prestart forward rotation electric power) is applied to the motor. Therefore, the impact between the hammer and the anvil does not produce an excessive large torque and, hence, the end tool is less likely to tighten the fastener with a torque greater than the target torque.

It is preferable that the hammer is configured to strike the anvil.

It is preferable that the electric power tool further includes an electric power detecting unit that detects the electric power and the power supply unit halts a supply of the electric power when the electric power detecting unit detects a prescribed electric power.

With this construction, the electric power supply to the motor is automatically halted to control the tightening torque on the fastener with high precision. Accordingly, the tightening torque can be controlled with high precision through the synergistic effect of supplying the prestart forward rotation electric power.

It is preferable that the power supply unit supplies the second electric power for a period of time longer than a period of time required for the hammer to contact the anvil.

With this construction, the period of time for supplying the second electric power (a prestart time) is set larger than the period of time required for the hammer to contact the anvil, ensuring that the hammer contacts the anvil within the prestart time period. Therefore, this configuration prevents the generation of a large force of impact when the hammer collides with the anvil, thereby reducing the occurrence of such large impacts. If the prestart time were set smaller than the time required for the hammer to contact the anvil, the hammer would accelerate prior to impacting the anvil with a large force.

It is preferable that the electric power tool further includes a trigger providing a stroke and the first drive force is changeable based on an amount of the stroke, and the second drive force is smaller than a predetermined value, and maintains a constant level regardless of the moving stroke.

It is preferable that the electric power is changed when the power supply unit modifies PWM duty cycle.

It is preferable that the second electric power is smaller than the predetermined value for a prescribed period of time.

According to still another aspect, the present invention provides an electric power tool. The electric power tool includes a motor, a hammer, an anvil, and a control unit. The hammer is drivingly rotatable in a forward direction and a reverse direction by the motor. The anvil is impacted by the hammer rotated in the forward direction and the reverse direction. The control unit controls the hammer such that a rotational speed of the hammer immediately before contacting the anvil is greater when the hammer is rotated in the reverse direction than when the hammer is rotated in the forward direction.

It is preferable that the electric power tool further includes a power supply unit for supplying to the motor an electric power which is greater when the hammer is initially rotated in the reverse direction than when the hammer is initially rotated in the forward direction.

It is preferable that the electric power tool further includes a power supply unit for supplying to the motor an electric power which is greater while the hammer is rotated in the reverse direction until the hammer contacts the anvil than while the hammer is rotated in the forward direction until the hammer contacts the anvil.

It is preferable that the power supply unit supplies to the motor the electric power having a greater PWM duty cycle while the hammer is rotated in the reverse direction until the hammer contacts the anvil than while the hammer is rotated in the forward direction until the hammer contacts the anvil.

It is preferable that the control unit controls the hammer such that an angular distance at which the hammer is rotated to contact the anvil is greater when the hammer is rotated in the reverse direction than when the hammer is rotated in the forward direction.

With these configurations, the impact between the hammer and the anvil when the hammer is rotated in the reverse direction is larger than that when the hammer is rotated in the forward direction. Thus, the electric power tool can loosen a bolt or a screw even when the torque of the electric power tool is set to the same value in the forward rotation (tightening) and the reverse rotation (loosening), thereby improving an operability.

It is preferable that the control unit controls the motor to perform a prestart in which the hammer is brought into contact with the anvil by a force that does not cause the anvil to be rotated when the hammer is about to be rotated in the forward direction, and the control unit omits the prestart when the hammer is about to be rotated in the reverse direction.

It is preferable that the electric power tool further includes a power supply unit for supplying an electric power to the motor, and the electric power is smaller in the prestart than a normal tightening operation for tightening a fastener.

According to still another aspect, the present invention provides an electric power tool. The electric power tool includes a motor, a hammer, an anvil, and a control unit. The hammer is drivingly rotatable in a forward direction by the motor. The anvil is impacted by the hammer rotated in the forward direction. The control unit controls the motor in a plurality of control mode. The control unit selectively switches the control mode for the motor when the hammer rotated in the forward direction contacts the anvil.

It is preferable that the control unit selectively switches the control mode from a first control mode in which a number of rotations of the motor is constant to a second control mode in which the number of rotations of the motor is increasingly changed when hammer rotated in the forward direction contacts the anvil.

With this configuration, the control unit can shift the next control more quickly when the first control is shifted to the second control upon contacting the hammer with the anvil than when the first control is shifted to the second control after a predetermined period of time has been elapsed. Hence, the operator can reduce unnecessary wait time before the fastening operations.

It is preferable that the electric power tool further includes a load detecting unit configured to detect a load applied to the motor, and the control unit selectively switches the control mode when the load increases greater than or equal to a prescribed value.

With this configuration, the control unit can shift the next control more quickly when the first control is shifted to the second control upon detecting the load greater than or equal to the prescribed value than when the first control is shifted to the second control after the predetermined period of time has been elapsed. Hence, the operator can reduce unnecessary wait time before the fastening operations.

It is preferable that the load detecting unit detects a number of rotations of the motor, and the control unit selectively switches the control mode when the number of rotations of the motor decreases lower than or equal to a predetermined value.

With this configuration, the control unit can shift the next control more quickly when the first control is shifted to the second control after the predetermined period of time has been elapsed than when the first control is shifted to the second control upon detecting the number of rotations lower than or equal to the predetermined value. Hence, the operator can reduce unnecessary wait time before the fastening operations.

It is preferable that the control unit selectively switches the control mode based on a positional relationship between the hammer and the anvil.

It is preferable that the control unit controls the motor to perform a prestart in which the hammer is brought into contact with the anvil by a force that does not cause the anvil to be rotated when the hammer is initially rotated in the forward direction, and the control unit controls the motor to halt the prestart and increase a number of rotations of the motor when the load increases greater than or equal to the prescribed value.

With this configuration, the control unit can shift the next control more quickly when the prestart is shifted to the next control upon detecting load greater than or equal to the prescribed value than when the prestart is shifted to the next control after the predetermined period of time has been elapsed. Hence, the operator can reduce unnecessary wait time before the fastening operations.

According to still another aspect, the present invention provides an electric power tool. The electric power tool includes a motor, a hammer, an anvil, and a detecting unit. The hammer is driven by the motor. The anvil is impacted by the hammer. The detecting unit is configured to detect a contact between the hammer and the anvil.

According to still another aspect, the present invention provides an electric power tool. The electric power tool includes a motor, a hammer, an anvil, a detecting unit, and a control unit. The hammer is driven by the motor. The anvil is impacted by the hammer. The detecting unit is configured to detect a contact between the hammer and the anvil. The control unit controls the motor to change a number of rotations of the motor when the detecting unit detects the contact.

Advantageous Effects of Invention

As described above, a power tool, an electric power tool, and an electronic pulse driver capable of preventing torque exceeding a target torque from being transferred to the fastener can be provided.

Further, an electric power tool having superior operability while reducing unnecessary wait time before fastening operations can be provided.

BRIEF DESCRIPTION OF DRAWINGS

In the drawings;

FIG. 3 is cross-sectional views of the electronic pulse driver taken along the plane and viewed in the direction indicated by the arrows III in FIG. 1;

FIG. 6 is a illustrating the control process when an wood screw is tightened in the clutch mode;

FIG. 7 is a graph illustrating the control process for tightening the bolt in a pulse mode;

FIG. 22 is a diagram illustrating a initial control process of the electronic pulse driver based on a positional relationship between a hammer and an anvil according to the fifth embodiment;

FIG. 25 is a graph illustrating a control process for tightening a self-drilling screw in the pulse mode according to a sixth embodiment of the present invention;

FIG. 27 is graphs showing a variation of the control process in the clutch mode according to a second modification of the present invention.

DESCRIPTION OF EMBODIMENTS

Next, a power tool according to a first embodiment of the present invention will be described while referring to FIGS.

Figure 1:
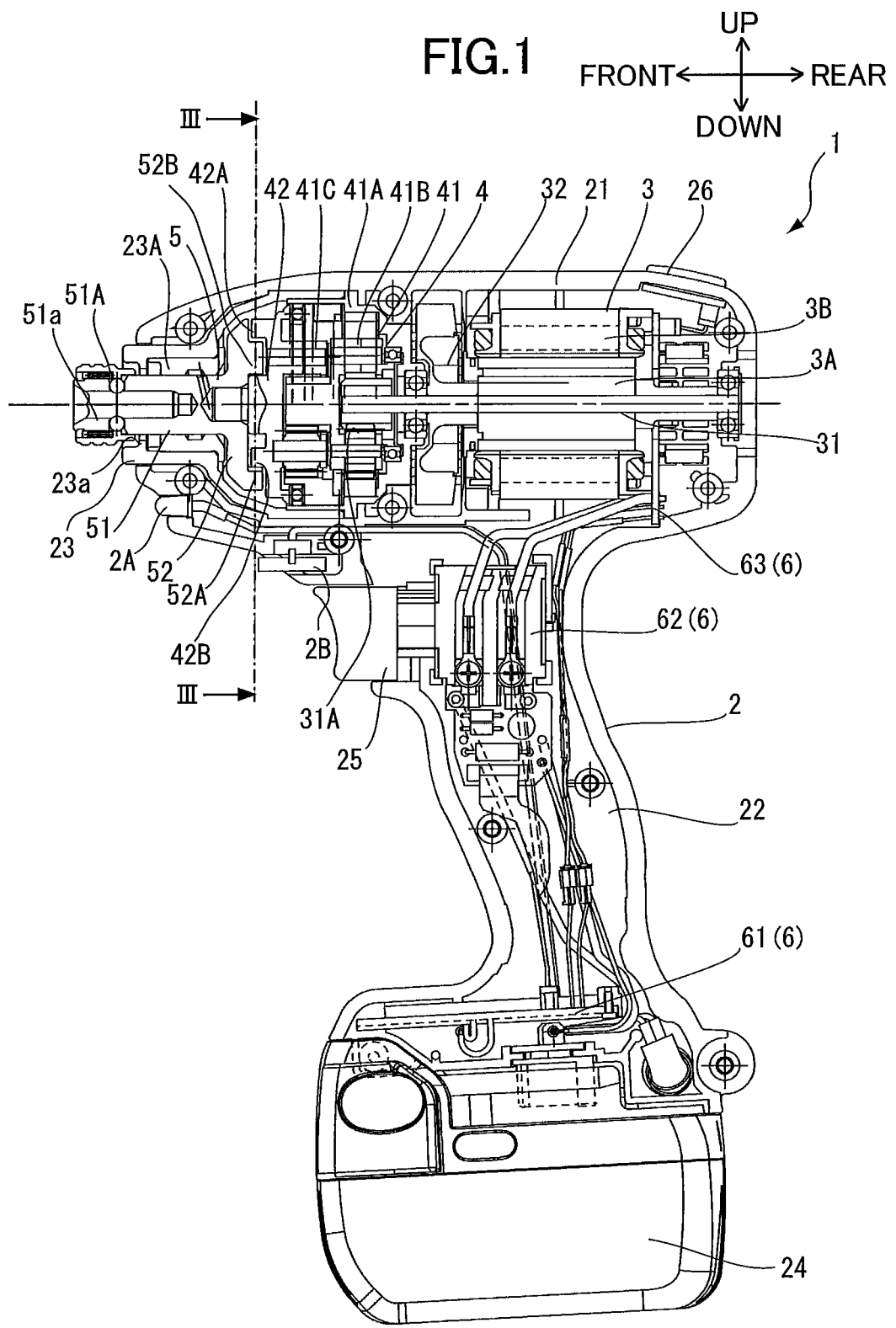
FIG. 1 is a cross-sectional view of an electronic pulse driver according to a first embodiment of the present invention.

1 through 11. FIG. 1 shows an electronic pulse driver 1 serving as the power tool of the first embodiment. As shown in FIG. 1, the electronic pulse driver 1 is primarily configured of a housing 2, a motor 3, a hammer unit 4, an anvil unit 5, and a switch mechanism 6. The housing 2 is formed of a resin material and constitutes the outer shell of the electronic pulse driver 1. The housing 2 is configured primarily of a substantially cylindrical body section 21, and a handle section 22 extending from the body section 21.

As shown in FIG. 1, the motor 3 is disposed inside the body section 21 and oriented with its axis aligned in the longitudinal direction of the body section 21. The hammer unit 4 and the anvil unit 5 are juxtaposed on one axial end of the motor 3. In the following description, forward and rearward directions are defined as directions parallel to the axis of the motor 3, with the forward direction (i.e., the direction toward the front side of the electronic pulse driver 1) being from the motor 3 toward the hammer unit 4 and anvil unit 5. A downward direction is defined as the direction from the body section 21 toward the handle section 22, and left and right directions are defined as directions orthogonal to the forward and rearward directions and the upward and downward directions.

A hammer case 23 is disposed at a forward position within the body section 21 for housing the hammer unit 4 and the anvil unit 5. The hammer case 23 is formed of a metal and is substantially funnel-shaped with its diameter growing gradually narrower toward the front end, which faces forward. An opening 23a is formed in the front end of the hammer case 23 so that an end tool mounting part 51 described later can protrude forward through the opening 23a. The hammer case 23 also has a bearing metal 23A provided on the inner wall of the hammer case 23 defining the opening 23a for rotatably supporting the anvil unit 5.

A light 2A is held in the body section 21 at a position beneath the hammer case 23 and near the opening 23a. When a bit (not shown) is mounted in the end tool mounting part 51 described later as the end tool, the light 2A can irradiate light near the front end of the bit. A dial 2B is also provided on the body section 21 below the light 2A. The dial 2B serves as a switching part that is rotatably operated by the operator. Since the body section 21 is constructed to retain the light 2A, there is no particular need to provide a separate part for holding the light 2A. Hence, the light 2A can be reliably held through a simple construction. The light 2A and the dial 2B are both disposed on the body section 21 at positions substantially in the left-to-right center thereof. An intake and an outlet (not shown) are also formed in the body section 21 through which external air is drawn into and discharged from the body section 21 by a fan 32 described later.

The handle section 22 is integrally configured with the body section 21 and extends downward from a position on the body section 21 in substantially the front-to-rear center thereof. The switch mechanism 6 is built into the handle section 22. A battery 24 is detachably mounted on the bottom end of the handle section 22 for supplying power to the motor 3 and the like. A trigger 25 is provided in the base portion of the handle section 22 leading from the body section 21 at a position on the front side serving as the location of user operations. Further, the trigger 25 is disposed beneath the dial 2B and in proximity to the same. Accordingly, a user can operate both the trigger 25 and the dial 2B with a single finger. The user switches an operating mode of the electronic pulse driver 1 among a drill mode, a clutch mode, and a pulse mode described later by rotating the dial 2B.

A display unit 26 is disposed on top of the body section 21 at the rear edge thereof. The display unit 26 indicates which of the drill mode, the clutch mode, and the pulse mode described later is currently selected.

As shown in FIG. 1, the motor 3 is a brushless motor primarily configured of a rotor 3A including an output shaft 31, and a stator 3B disposed in confrontation with the rotor 3A. The motor 3 is arranged in the body section 21 so that the axis of the output shaft 31 is oriented in the front-to-rear direction. The output shaft 31 protrudes from both front and rear ends of the rotor 3A and is rotatably supported in the body section 21 at the protruding ends by bearings. The fan 32 is disposed on the portion of the output shaft 31 protruding forward from the rotor 3A. The fan 32 rotates integrally and coaxially with the output shaft 31. A pinion gear 31A is provided on the forwardmost end of the portion of the output shaft 31 protruding forward from the rotor 3A. The pinion gear 31A rotates integrally and coaxially with the output shaft 31.

The hammer unit 4 is housed in the hammer case 23 on the front side of the motor 3. The hammer unit 4 primarily includes a gear mechanism 41, and a hammer 42. The gear mechanism 41 includes a single outer ring gear 41A, and two planetary gear mechanisms 41B and 41C that share the same outer ring gear 41A. The outer ring gear 41A is housed in the hammer case 23 and fixed to the body section 21. The planetary gear mechanism 41B is disposed in the outer ring gear 41A and is engaged with the same. The planetary gear mechanism 41B uses the pinion gear 31A as a sun gear. The planetary gear mechanism 41C is also disposed in the outer ring gear 41A and is engaged with the same. The planetary gear mechanism 41C is positioned forward of the planetary gear mechanism 41B and uses the output shaft of the planetary gear mechanism 41B as a sun gear.

The hammer 42 is defined in the front surface of a planet carrier constituting the planetary gear mechanism 41C. As shown in FIG. 3, the hammer 42 includes a first engaging protrusion 42A disposed at a position offset from the rotational center of the planet carrier and protruding forward, and a second engaging protrusion 42B disposed on the opposite side of the rotational center of the planet carrier from the first engaging protrusion 42A.

The anvil unit 5 is disposed in front of the hammer unit 4 and primarily includes the end tool mounting part 51, and an anvil 52. The end tool mounting part 51 is cylindrical in shape and rotatably supported in the opening 23a of the hammer case 23 through the bearing metal 23A. The end tool mounting part 51 has an insertion hole 51a penetrating the front end of the end tool mounting part 51 toward the rear end of the same for inserting the bit (not shown), and a chuck 51A at the front end of the end tool mounting part 51 for holding the bit (not shown).

The anvil 52 is disposed in the hammer case 23 on the rear side of the end tool mounting part 51 and is integrally formed with the end tool mounting part 51. As shown in FIG. 3, the anvil 52 includes a first engagement protrusion 52A disposed at a position offset from the rotational center of the end tool mounting part 51 and protruding rearward, and a second engagement protrusion 52B positioned on the opposite side of the rotational center of the end tool mounting part 51 from the first engagement protrusion 52A. When the hammer 42 rotates, the first engaging protrusion 42A collides with the first engagement protrusion 52A at the same time the second engaging protrusion 42B collides with the second engagement protrusion 52B, transmitting the torque of the hammer 42 to the anvil 52. This operation will be described later in greater detail.

The switch mechanism 6 is configured of a circuit board 61, a trigger switch 62, a switching board 63, and wiring connecting these components. The circuit board 61 is disposed inside the handle section 22 at a position near the battery 24 and is connected to the battery 24. In addition, the circuit board 61 is connected to the light 2A, the dial 2B, the trigger switch 62, the switching board 63, and the display unit 26.

Figure 2:
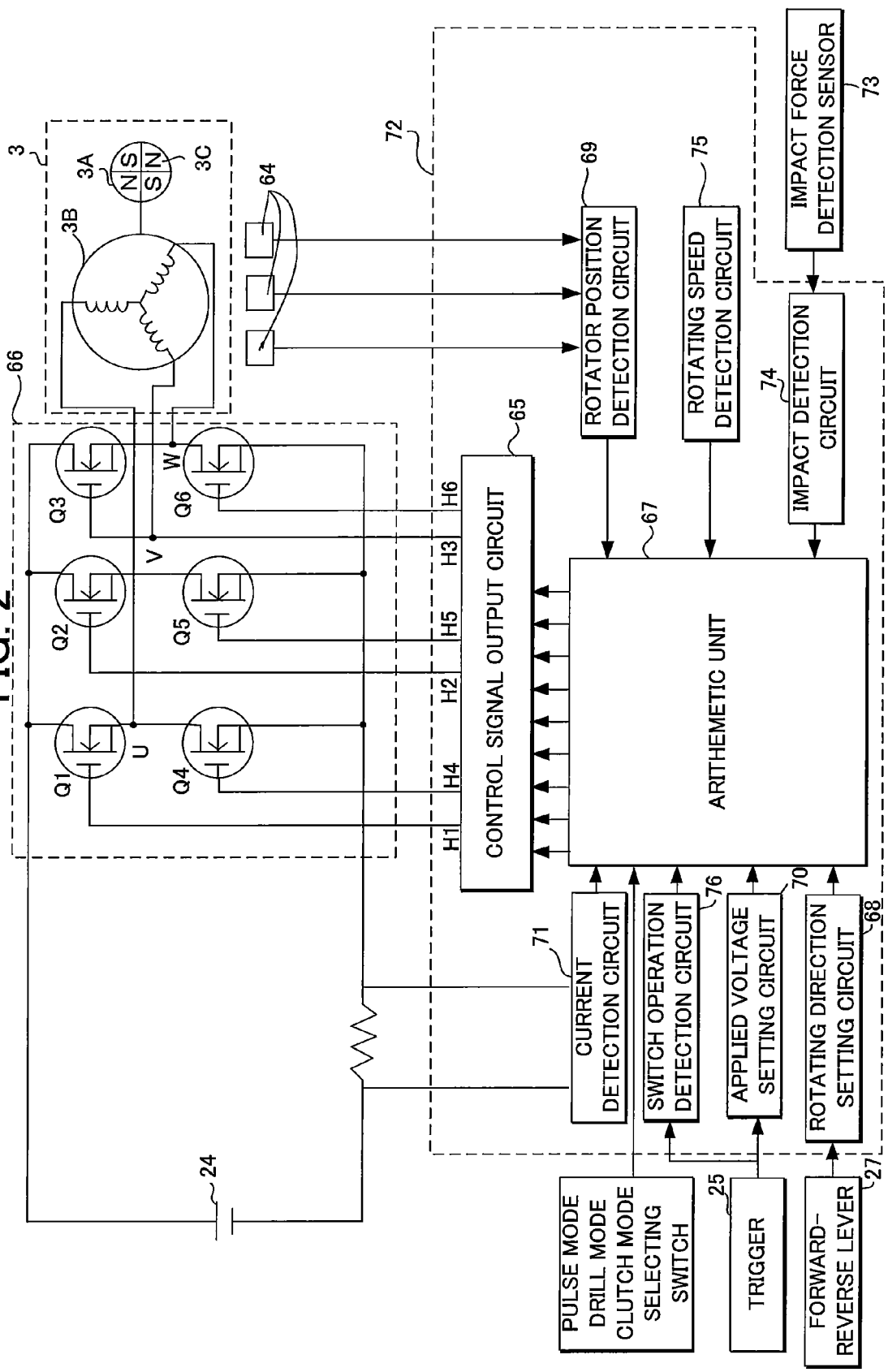
FIG. 2 is a block diagram of the electronic pulse driver.

Next, the structure of a control system for driving the motor 3 will be described with reference to FIG. 2. In the first embodiment, the motor 3 is configured of a 3-phase brushless DC motor. The rotor 3A of this brushless DC motor is configured of a plurality (two in the first embodiment) of permanent magnets 3C each having an N-pole and an S-pole. The stator 3B is configured of 3-phase, star-connected stator coils U, V, and W. Hall elements 64 are provided on the switching board 63 at prescribed intervals along the circumferential direction of the rotor 3A (every 60 degrees, for example) for detecting the rotated position of the rotor 3A. The Hall elements 64 output position detection signals, based on which signals the time and direction of current supplied to the stator coils U, V, and W can be controlled to control the rotation of the motor 3. The Hall elements 64 are disposed at positions confronting the permanent magnets 3C of the rotor 3A on the switching board 63.

Electronic elements mounted on the switching board 63 include six switching elements Q1-Q6 configured of FETs or the like connected in a 3-phase bridge configuration. The gates of the switching elements Q1-Q6 are connected to a control signal output circuit 65 mounted on the circuit board 61, and the drains or sources of the switching elements Q1-Q6 are connected to the stator coils U, V, and W. The switching elements Q1-Q6 constitute an inverter circuit 66. With this configuration, the switching elements Q1-Q6 perform switching operations based on switching element drive signals (drive signals H4, H5, H6, and the like) inputted from the control signal output circuit 65 and supplies power to the stator coils U, V, and W by converting the DC voltage of the battery 24 applied to the inverter circuit 66 to 3-phase (U-phase, V-phase, and W-phase) voltages Vu, Vv, and Vw.

Of the switching element drive signals (3-phase signals) used to drive the gates of the six switching elements Q1-Q6, pulse width modulation signals (PWM signals) H4, H5, and H6 are supplied to the switching elements Q4, Q5, and Q6 on the negative power supply side. An arithmetic unit 67 mounted on the circuit board 61 adjusts the quantity of power supplied to the motor 3 by modifying the pulse width (duty cycle) of the PWM signal based on a detection signal for the operation time (stroke) of the trigger 25 in order to control starting, stopping, and rotational speed of the motor 3.

The PWM signal is supplied to one of either the switching elements Q1-Q3 on the positive power supply side of the inverter circuit 66 or the switching elements Q4-Q6 on the negative power supply side. By rapidly switching the switching elements Q1-Q3 or the switching elements Q4-Q6, it is possible to control the DC voltage of power supplied to each of the stator coils U, V, and W from the battery 24. Since the PWM signal is supplied to the switching elements Q4-Q6 on the negative power supply side, it is possible to adjust the power supplied to the stator coils U, V, and W by controlling the pulse width of the PWM signal, thereby controlling the rotational speed of the motor 3.

A control unit 72 is also mounted on the circuit board 61. The control unit 72 includes the control signal output circuit 65 and the arithmetic unit 67, as well as a current detection circuit 71, a switch operation detection circuit 76, an applied voltage setting circuit 70, a rotating direction setting circuit 68, a rotor position detection circuit 69, a rotating speed detection circuit 75, and an impact detection circuit 74. While not shown in the drawings, the arithmetic unit 67 is configured of a central processing unit (CPU) for outputting a drive signal based on a program and control data, a ROM for storing the program and control data, a RAM for temporarily storing process data during the process, and a timer. The arithmetic unit 67 generates drive signals for continually switching prescribed switching elements Q1-Q6 based on output signals from the rotating direction setting circuit 68 and the rotor position detection circuit 69 and for outputting these drive signals to the control signal output circuit 65. Through this construction, a current is supplied in turns to prescribed stator coils U, V, and W in order to rotate the rotor 3A in a desired direction. At this time, the arithmetic unit 67 outputs drive signals to be applied to the switching elements Q4-Q6 on the negative power supply side as PWM signals based on a control signal outputted from the applied voltage setting circuit 70. The current detection circuit 71 measures the current supplied to the motor 3 and outputs this value to the arithmetic unit 67 as feedback, whereby the arithmetic unit 67 adjusts the drive signals to supply a prescribed power for driving the motor 3. Here, the arithmetic unit 67 may also apply PWM signals to the switching elements Q1-Q3 on the positive power supply side.

The electronic pulse driver 1 is also provided with a forward-reverse lever 27 for toggling the rotating direction of the motor 3. The rotating direction setting circuit 68 detects changes in the forward-reverse lever 27 and transmits a control signal to the arithmetic unit 67 to toggle the rotating direction of the motor 3. An impact force detection sensor 73 is connected to the control unit 72 for detecting the magnitude of impact generated in the anvil 52. A signal outputted from the impact force detection sensor 73 is inputted into the arithmetic unit 67 after passing through the impact detection circuit 74.

FIG. 3 shows cross-sectional views of the electronic pulse driver 1 taken along the plane and viewed in the direction indicated by the arrows III in FIG. 1. The cross-sectional views in FIG. 3 illustrate the positional relationship between the hammer 42 and the anvil 52 when the electronic pulse driver 1 is operating. FIG. 3(1) shows the states of the hammer 42 and the anvil 52 when the first engaging protrusion 42A is in contact with the first engagement protrusion 52A at the same time the second engaging protrusion 42B is in contact with the second engagement protrusion 52B. The first engaging protrusion 42A has an outer radius RH3 equivalent to an outer radius RA3 of the first engagement protrusion 52A. The state shown in FIG. 3(2) is reached when the hammer 42 is rotated clockwise in FIG. 3 from the state in FIG. 3(1). The first engaging protrusion 42A has an inner radius RH2 that is greater than an outer radius RA1 of the second engagement protrusion 52B. Accordingly, the first engaging protrusion 42A and the second engagement protrusion 52B do not contact each other. Similarly, the second engaging protrusion 42B has an outer radius RH1 set smaller than an inner radius RA2 of the first engagement protrusion 52A. Accordingly, the second engaging protrusion 42B and the first engagement protrusion 52A do not contact each other. When the hammer 42 rotates to the position shown in FIG. 3(3), the motor 3 begins to rotate in forward, driving the hammer 42 to rotate in the counterclockwise direction. In the state shown in FIG. 3(3), the hammer 42 has rotated in reverse to the maximum point relative to the anvil 52 at which point the rotating direction is changed. As the motor 3 rotates forward, the hammer 42 passes through the state shown in FIG. 3(4), and the first engaging protrusion 42A collides with the first engagement protrusion 52A at the same time the second engaging protrusion 42B collides with the second engagement protrusion 52B, as shown in FIG. 3(5). The force of impact rotates the anvil 52 counterclockwise, as shown in FIG. 3(6).

In this way, the two engaging protrusions provided on the hammer 42 collide with the two engagement protrusions provided on the anvil 52 at positions symmetrical about the rotational centers of the hammer 42 and anvil 52. This configuration provides balance and stability in the electronic pulse driver 1 during impacts so that the operator feels less vibration at this time.

Since the inner radius RH2 of the first engaging protrusion 42A is greater than the outer radius RA1 of the second engagement protrusion 52B and the outer radius RH1 of the second engaging protrusion 42B is smaller than the inner radius RA2 of the first engagement protrusion 52A, the hammer 42 and the anvil 52 can rotate more than 180 degrees relative to each other. This enables the hammer 42 to reverse directions of rotation at an angle relative to the anvil 52 that allows sufficient distance for acceleration.

The first engaging protrusion 42A and the second engaging protrusion 42B can respectively collide with the first engagement protrusion 52A and the second engagement protrusion 52B on both circumferential side surfaces thereof, leading to the possibility of impact operations during not only forward rotations, but also reverse rotations. Hence, the present invention provides a user-friendly impact tool. Further, since the hammer 42 does not strike the anvil 52 along an axial direction of the hammer 42 (forward), the end tool is not pressed into the workpiece. This configuration is effective when driving wood screws into wood.

Next, the operating modes available in the electronic pulse driver 1 according to the first embodiment will be described with reference to FIGS. 4 through 9. The electronic pulse driver 1 according to the first embodiment has the drill mode, the clutch mode, and the pulse mode, for a total of three operating modes.

Figure 4:
FIG. 4 is a graph illustrating a control process of the electronic pulse driver when a fastener is tightened in a drill mode.

In the drill mode, the hammer 42 and the anvil 52 are rotated as one. Therefore, this mode is normally used for tightening wood screws and the like. In this mode, the electronic pulse driver 1 gradually increases the supply of electric current to the motor 3 as a fastening operation progresses, as illustrated in FIG. 4.

Figure 5:
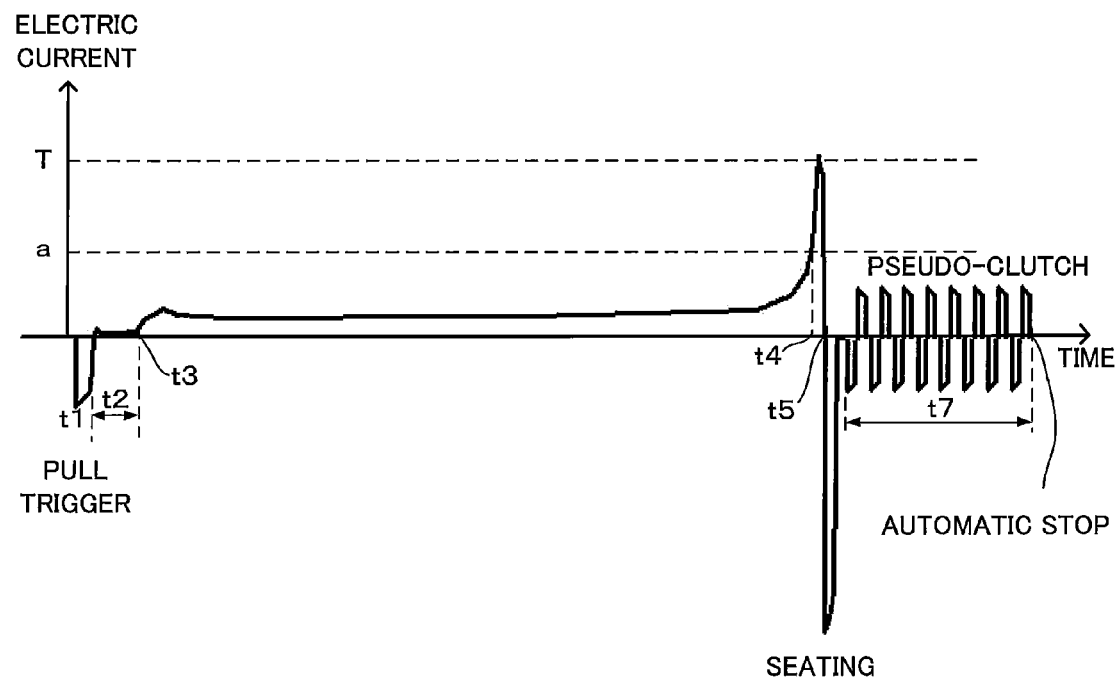
FIG. 5 is a graph illustrating the control process when a bolt is tightened in a clutch mode.

The clutch mode is mainly used when emphasizing a proper tightening torque, such as when tightening cosmetic fasteners or the like that remain visible on the exterior of the workpiece after the fastening operation. As shown in FIGS. 5 and 6, the hammer 42 and the anvil 52 are integrally rotated in the clutch mode, while gradually increasing the electric current supplied to the motor 3, and driving of the motor 3 is halted when the electric current reaches a target value (target torque). In the clutch mode, the motor 3 is reversed in order to produce a pseudo-clutch effect. The motor 3 is also reversed to prevent the driver from stripping a screw when tightening wood screws (see FIG. 6).

Figure 8:
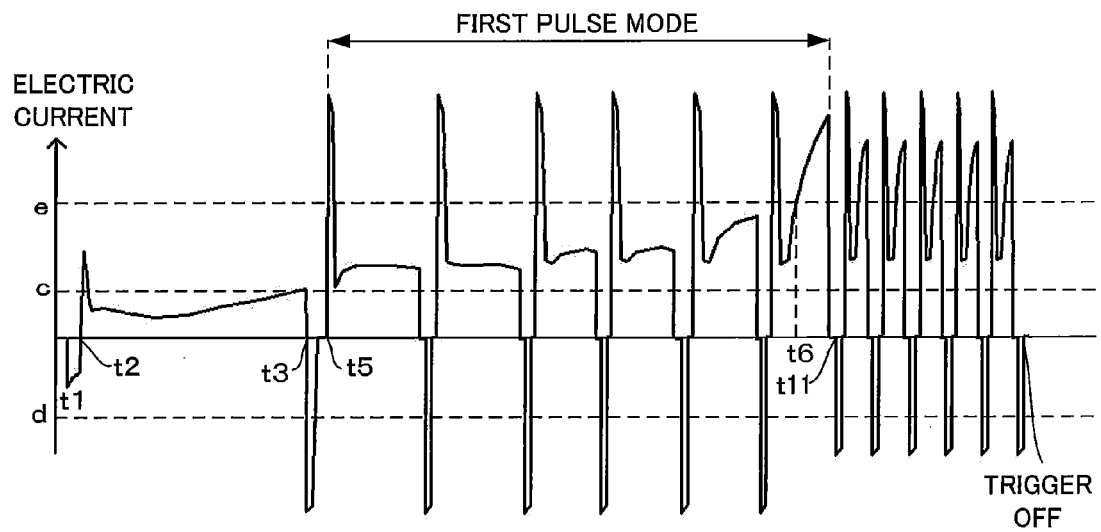
FIG. 8 is a graph illustrating the control process when not shifting to a second pulse mode while tightening a wood screw in the pulse mode.
Figure 9:
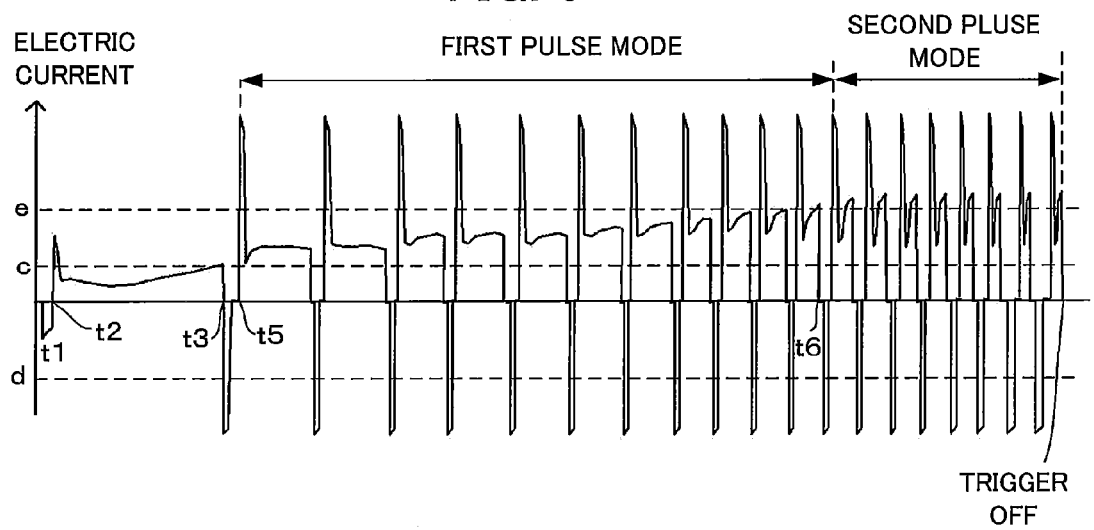
FIG. 9 is a graph illustrating the control process when shifting to the second pulse mode while tightening a wood screw in the pulse mode.

The pulse mode is used primarily when tightening long screws used in areas that will not be outwardly visible. As illustrated in FIGS. 7 through 9, the hammer 42 and the anvil 52 are rotated as one in the pulse mode, while the electric current supplied to the motor 3 is gradually increased. The rotating direction of the motor 3 is alternated between the forward direction and the reverse direction when the electric current reaches prescribed values (prescribed torques) and the fasteners are tightened by impacts generated when switching directions. This mode can supply a strong tightening force, while reducing the reaction force from the workpiece.

Next, a control process performed by the control unit 72 when the electronic pulse driver 1 of the first embodiment performs the fastening operation will be described. A description of the control process will be omitted for the drill mode since the control unit 72 does not perform any special control in this mode. Further, the following description will not account for a start-up current when making determinations based on the electric current. The description will also not consider any sudden spikes in the electric current when applying a current for forward rotation because spikes in the electric current that occur when applying an electric current for normal rotation, as shown in FIGS. 6 through 9 for example, do not contribute to screw or bolt tightening. Such spikes in electric current can be ignored by providing approximately 20 ms of dead time, for example.

Figure 10:
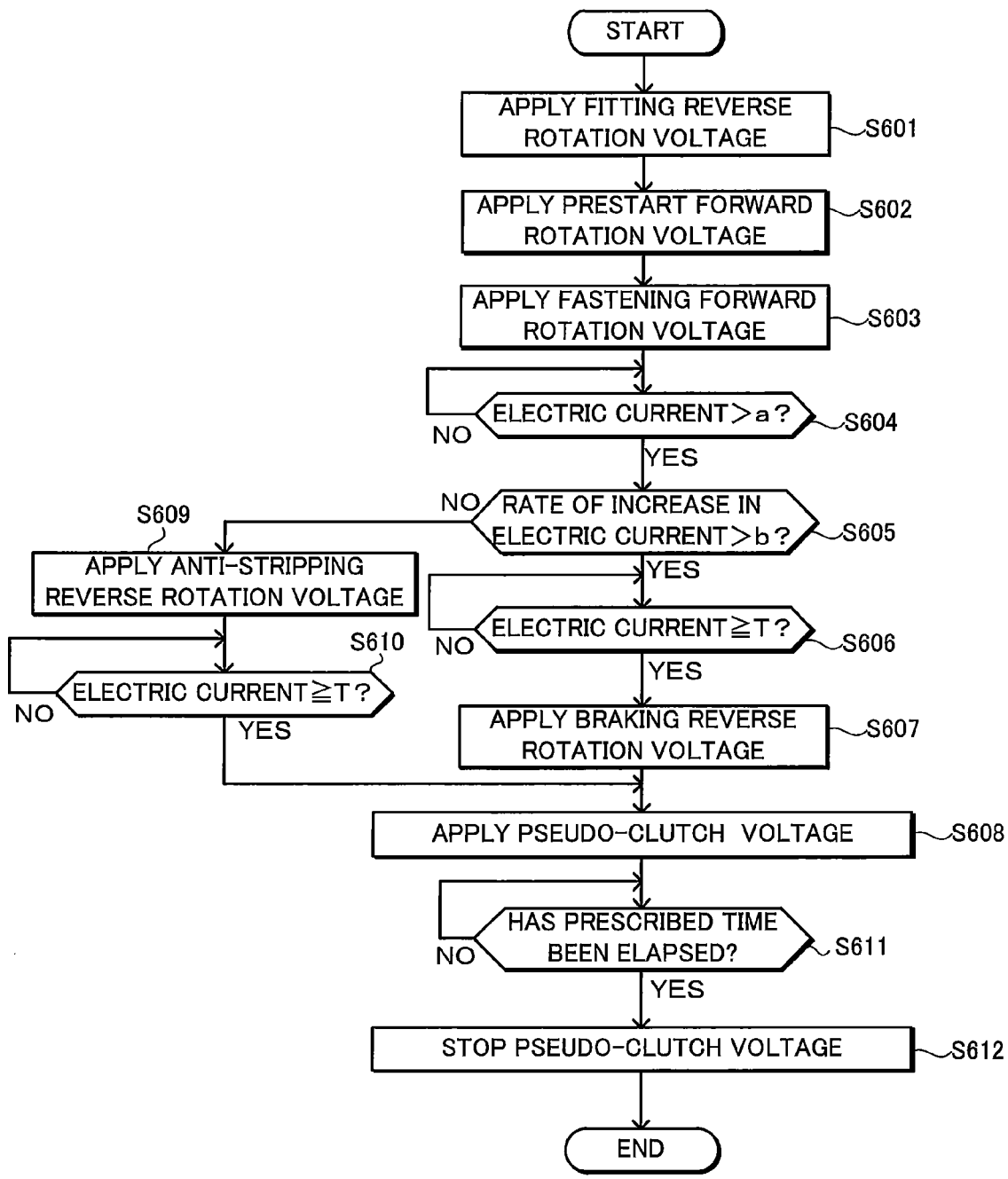
FIG. 10 is a flowchart illustrating steps in the control process when tightening a fastener in the clutch mode.

First, a control process during the clutch mode will be described with reference to FIGS. 5, 6, and 10. FIG. 5 is a graph describing the control process when a bolt or other fastener (a bolt will be assumed in this example) is tightened in the clutch mode. FIG. 6 is a graph for describing the control process for tightening a wood screw or similar fastener (a wood screw will be assumed in this example) during the clutch mode. FIG. 10 is a flowchart illustrating steps in the control process performed by the control unit 72 when tightening a fastener in the clutch mode.

The control unit 72 begins the control process illustrated in the flowchart of FIG. 10 when the operator squeezes the trigger 25. In the clutch mode according to the first embodiment, the control unit 72 determines that the target torque has been reached when the current supplied to the motor 3 increases to a target current T (see FIGS. 5 and 6) and ends the fastening operation at this time.

When the operator squeezes the trigger 25, in S601 of FIG. 10 the control unit 72 applies a fitting reverse rotation voltage to the motor 3, causing the hammer 42 to rotate in reverse and lightly tap the anvil 52 (t1 in FIGS. 5 and 6). In the first embodiment, the fitting reverse rotation voltage is set to 5.5 V, and the application time for this voltage is 200 ms. This operation ensures that the end tool is reliably seated in the head of the fastener.

Since the hammer 42 and the anvil 52 might be separated at the time the trigger is pulled, supplying electric current to the motor 3 will cause the hammer 42 to strike the anvil 52. However, in the clutch mode, an electric current is supplied to the motor 3 while the hammer 42 and the anvil 52 rotate together, and driving of the motor 3 is halted when the current value reaches the target current T (target torque). If the anvil 52 is impacted in this mode, the impact alone may transmit torque to the fastener that exceeds the target value. This problem is particularly pronounced when retightening a screw or the like that has already been tightened.

Therefore, in S602 the control unit 72 applies a prestart forward rotation voltage to the motor 3 for placing the hammer 42 in contact with the anvil 52 (a prestart operation) without rotating the anvil 52 (t2 in FIGS. 5 and 6). In the first embodiment the prestart forward rotation voltage is set to 1.5 V and the application time of this voltage is set to 800 ms. Since the hammer 42 and the anvil 52 can be separated by as much as 315 degrees, a period t2 is set to the time required for the motor 3 to rotate the hammer 42 315 degrees when the prestart forward rotation voltage is applied to the motor 3.

In S603 the control unit 72 applies a fastening forward rotation voltage to the motor 3 for tightening a fastener (t3 in FIGS. 5 and 6). In S604 the control unit 72 determines whether the electric current flowing to the motor 3 is greater than a threshold value a. In the first embodiment, the fastening forward rotation voltage is set to 14.4 V. The threshold value a is set to a current value marking the final phase in tightening a wood screw within a range that does not strip the screw. In the first embodiment, the threshold value a is set to 15 A.

When the electric current flowing to the motor 3 exceeds the threshold value a (S604: YES; t4 in FIGS. 5 and 6), in S605 the control unit 72 determines whether the rate of increase in electric current exceeds a threshold value b. Using the example shown in FIG. 5, the rate of current increase can be calculated from the expression (A(Tr+t)−A(Tr))/A(Tr), where t indicates the elapsed time after a certain point Tr. In the example of FIG. 6, the rate of increase in electric current can be calculated from the expression (A(N+1)−A(N))/A(N), where N is the maximum load current for a first forward rotation current and N+1 is the maximum load current for the forward rotation current following the first forward rotation current. In the example of FIG. 6, the threshold value b of (A(N+1)−A(N))/A(N) is set to 20%.

While the electric current flowing to the motor 3 is normally increased abruptly during the final phase of tightening a bolt, as shown in FIG. 5, the electric current is increased gradually when tightening a wood screw, as shown in FIG. 6.

Therefore, the control unit 72 determines that the fastener is a bolt when the rate of increase in electric current exceeds the threshold value b (S605: YES) at the point that the current flowing to the motor 3 is greater than the threshold value a and determines that the fastener is a wood screw when the rate of increase at this time is less than or equal to the threshold value b (S605: NO).

When the rate of increase in electric current is greater than the threshold value b (S605: YES), indicating that the fastener is a bolt, then the control unit 72 allows the electric current to increase further since there is no need to account for stripping in this case. In S606 the control unit 72 determines whether the electric current has increased to the target current T and halts the supply of torque to the bolt when the current reaches the target current T (S606: YES; t5 in FIG. 5). However, since the current increases rapidly in the case of a bolt, as described above, simply ceasing to apply a forward rotation voltage to the motor 3 may not be sufficient to halt the supply of torque to the bolt generated by the inertial force of the rotating components. Accordingly, in the first embodiment the control unit 72 applies a braking reverse rotation voltage to the motor 3 in S607 (t5 of FIG. 5) in order to completely halt the supply of torque to the bolt. In the first embodiment, the application time for the braking reverse rotation voltage is set to 5 ms.

In S608 the control unit 72 alternately applies a forward rotation voltage and a reverse rotation voltage to the motor 3 for a pseudo-clutch (hereinafter collectively referred to as a "pseudo-clutch voltage", t7 in FIGS. 5 and 6). In the first embodiment, the application time for the pseudo-clutch forward and reverse rotation voltages is 1000 ms (1 second). Here, the pseudo-clutch functions to notify the operator that the desired torque was produced based on the electric current reaching the target current T. Although the motor 3 has not actually ceased to output power at this time, the pseudo-clutch simulates a loss of power from the motor in order to alert the operator.

The hammer 42 separates from the anvil 52 when the control unit 72 applies the pseudo-clutch reverse rotation voltage and strikes the anvil 52 when the control unit 72 applies the pseudo-clutch forward rotation voltage. However, since the forward and reverse rotation voltages for the pseudo-clutch are set to a level insufficient to apply a tightening force to the fastener (2 V, for example), the pseudo-clutch is manifested merely as the sound of the hammer 42 impacting the anvil 52. Through the sound of the pseudo-clutch, the operator can tell when tightening has finished.

On the other hand, if the rate of increase in electric current is less than or equal to the threshold value b (S605: NO), indicating that the fastener is a wood screw for which stripping must be considered, in S609 the control unit 72 applies an anti-stripping reverse rotation voltage to the motor 3 at prescribed intervals during the fastening voltage (t5 in FIG. 6). The stripping of screws is a problem that occurs when the cross-shaped protruding part of the end tool (bit) fitted in the cross-shaped recessed part formed in the head of a wood screw becomes unseated from the recessed part and chews up the edges of the recessed part due to the torque of the end tool being unevenly applied to the recessed part. The anti-stripping reverse rotation voltage applied to the motor 3 reverses the rotation of the anvil 52, allowing the cross-shaped protruding part of the end tool attached to the anvil 52 to remain firmly seated in the cross-shaped protruding part of the wood screw head. The anti-stripping reverse rotation voltage is not employed to increase the accelerating distance for the hammer 42 to strike the anvil 52, but rather to have the hammer 42 apply reverse rotation to the anvil 52 sufficient for the anvil 52 to apply reverse torque to the screw. In the first embodiment, the anti-stripping reverse rotation voltage is set to 14.4 V.

In S610 the control unit 72 determines whether the electric current has risen to the target current T. If so (S610: YES; t6 in FIG. 6), in S608 the control unit 72 alternately applies the pseudo-clutch voltage to the motor 3 (t7 in FIG. 6), notifying the user that the fastening operation has finished.

In S611 the control unit 72 waits for a prescribed time to elapse after beginning to apply the pseudo-clutch voltage. After the prescribed time has elapsed (S611: YES), in S612 the control unit 72 halts the application of the pseudo-clutch voltage.

Figure 11:
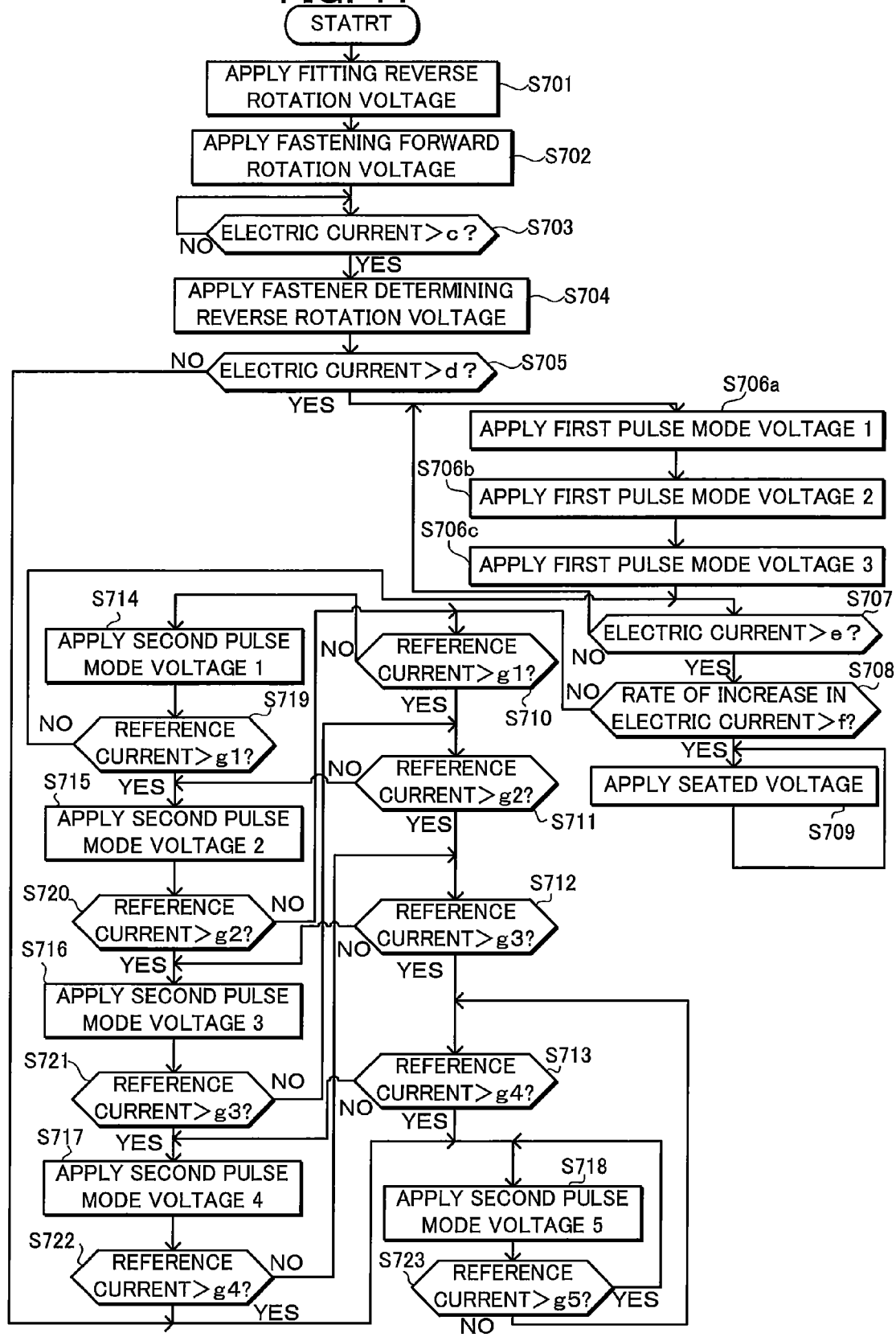
FIG. 11 is a flowchart illustrating steps in the control process when tightening a fastener in the pulse mode.

Next, the control process of the control unit 72 when the operating mode is set to the pulse mode will be described with reference to FIGS. 7 through 9 and FIG. 11. FIG. 7 is a graph illustrating the control process for tightening a bolt in the pulse mode. FIG. 8 is a graph illustrating the control process when not shifting to a second pulse mode described later while tightening a wood screw in the pulse mode. FIG. 9 is a graph illustrating the control process when shifting to the second pulse mode described later while tightening a wood screw in the pulse mode. FIG. 11 is a flowchart illustrating steps in the control process when tightening a fastener in the pulse mode.

As in the clutch mode described above, the control unit 72 begins the control process illustrated in the flowchart of FIG. 11 when the operator squeezes the trigger.

As in the clutch mode described above, when the trigger is squeezed in the pulse mode, in S701 the control unit 72 applies the fitting reverse rotation voltage to the motor 3 (t1 in FIGS. 7-9). However, since the control process in the pulse mode does not emphasize tightening with a proper torque, the prestart step in S602 of the clutch mode is omitted from this process.

In S702 the control unit 72 applies the fastening forward rotation voltage described in the clutch mode (t2 in FIGS. 7-9). In S703 the control unit 72 determines whether the electric current flowing to the motor 3 is greater than a threshold value c.

While the load (current) increases gradually in the earlier stage of tightening a wood screw, the load increases very little in the earlier stage of tightening a bolt, but suddenly spikes at a certain point after tightening has progressed. Once a load is applied while tightening a bolt, the reaction force received from a fastener coupled to the bolt becomes larger than the reaction force received from the workpiece when tightening a wood screw. Hence, when a reverse rotation voltage is applied to the motor 3 while fastening a bolt, the absolute value of the reverse rotation current flowing to the motor 3 is smaller than that when fastening a wood screw since an auxiliary force is received from the fastener coupled to the bolt relative to the reverse rotation voltage. In the first embodiment, the electric current supplied to the motor 3 when fastening a bolt at about the time the load begins to increase is set as the threshold value c (15 A, for example).

When the electric current supplied to the motor 3 is greater than the threshold value c (S703: YES), in S704 the control unit 72 applies a fastener determining reverse rotation voltage to the motor 3 (t3 in FIGS. 7-9). The fastener determining reverse rotation voltage is set to a value that does not cause the hammer 42 to impact the anvil 52 (14.4 V, for example).

In S705 the control unit 72 determines whether the absolute value of the electric current supplied to the motor 3 when the fastener determining reverse rotation voltage was applied is greater than a threshold value d. The control unit 72 determines that the fastener is a wood screw when the current is greater than the threshold value d (FIGS. 8 and 9) and a bolt when the current value is less than or equal to the threshold value d (FIG. 7), and controls the motor 3 to perform impact fastening suited to the determined type of fastener. In the first embodiment, the threshold value d is set to 20 A.

Impact fastening more specifically refers to alternately applying a forward rotation voltage and a reverse rotation voltage to the motor 3. In the first embodiment, the control unit 72 alternately applies a forward rotation voltage and a reverse rotation voltage to the motor 3 in order that the period for applying the reverse rotation voltage (hereinafter referred to as the "reverse rotation period") relative to the period for applying the forward rotation voltage (hereinafter referred to as the "forward rotation period") increases in proportion to the increase in load.

It is common for an electric power tool to shift to tightening by impact when pressure tightening becomes difficult, but preferably the transition is gradual enough to feel smooth to the operator. Hence, the electronic pulse driver 1 according to the first embodiment performs pressure-centric impact fastening in a first pulse mode and impact-centric impact fastening in a second pulse mode.

More specifically, in the first pulse mode the control unit 72 supplies a pressing force to the fastener using a longer forward rotation period. However, in the second pulse mode the control unit 72 supplies an impact force by gradually increasing the reverse rotation period while gradually reducing the forward rotation period as load increases. During the first pulse mode in the first embodiment, the control unit 72 gradually decreases the forward rotation while leaving the reverse rotation period unchanged as load increases, in order to lessen the reaction force from the workpiece.

Returning to the flowchart in FIG. 11, shifts between the first and second pulse modes will be described.

When the absolute value of electric current applied to the motor 3 is greater than the threshold value d (S705: YES), the control unit 72 shifts between the first and the second pulse modes for tightening a wood screw.

First, in S706a-S706c the control unit 72 applies first pulse mode voltages to the motor 3 for performing pressure-centric impact tightening (t5 in FIGS. 8 and 9). Specifically, in S706a the control unit 72 performs one set comprising: pausing for 5 ms→applying a reverse rotation voltage for 15 ms→pausing for 5 ms applying a forward rotation voltage for 300 ms. After a prescribed interval has elapsed, in S706b the control unit 72 performs one set comprising: pausing for 5 ms→applying a reverse rotation voltage for 15 ms→pausing for 5 ms→applying a forward rotation voltage for 200 ms. After another prescribed interval has elapsed, in S706c the control unit 72 performs one set comprising: pausing for 5 ms→applying a reverse rotation voltage for 15 ms→pausing for 5 ms→applying a forward rotation voltage for 100 ms.

In S707 the control unit 72 determines whether the electric current flowing to the motor 3 when applying voltages for the first pulse mode is greater than a threshold value e. The threshold value e is used to determine whether the operating mode should be shifted to the second pulse mode and is set to 75 A in the first embodiment.

If the electric current supplied to the motor 3 when applying the first pulse mode voltage (forward rotation voltage) is less than or equal to the threshold value e (S707: NO), the control unit 72 repeats the processes in S706a-S706c and S707. As the number of applications of voltages for the first pulse mode increases, load increases and the reaction force from the workpiece increases. In order to lessen this reaction force, the control unit 72 applies voltages in the first pulse mode for gradually reducing the forward rotation period, while maintaining the reverse rotation period unchanged. In the first embodiment, the forward rotation period decreases according to the steps 300 ms→200 ms→100 ms.

However, if the electric current flowing to the motor 3 when applying the first pulse mode voltage (forward rotation voltage) is greater than the threshold value e (S707: YES; t6 in FIGS. 8 and 9), in S708 the control unit 72 determines whether the rate of increase in electric current due to the first pulse mode voltage (forward rotation voltage) is greater than a threshold value f. The threshold value f is used to determine whether the wood screw is seated in the workpiece and is set to 4% in the first embodiment.

If the rate of increase in electric current is greater than the threshold value f (S708: YES), it is assumed that the wood screw is seated in the workpiece. Accordingly, in S709 the control unit 72 applies a seated voltage to the motor 3 for reducing the subsequent reaction force (t11 in FIG. 8). In the first embodiment, the seated voltage involves repeating the following set: pausing for 5 ms→applying a reverse rotation voltage for 15 ms→pausing for 5 ms→applying a forward rotation voltage for 40 ms.

However, if the rate of increase in electric current is less than or equal to the threshold value f (S708: NO), then it is assumed that the load has increased regardless of whether the wood screw is seated in the workpiece. Hence, the pressure-centric tightening force provided by the first pulse mode voltage is considered insufficient, and the control unit 72 subsequently shifts the operating mode to the second pulse mode.

In the first embodiment, the voltage in the second pulse mode is selected from among five second pulse mode voltages 1-5. The second pulse mode voltages 1-5 are each configured as a set that includes a reverse rotation voltage and a forward rotation voltage such that the reverse rotation period sequentially increases while the forward rotation period sequentially decreases in order from voltage 1 to voltage 5. Specifically, second pulse mode voltage 1 comprises pausing for 5 ms→applying a reverse rotation voltage for 15 ms→pausing for 5 ms→applying a forward rotation voltage for 75 ms; second pulse mode voltage 2 comprises pausing for 7 ms→applying a reverse rotation voltage for 18 ms→pausing for 10 ms→applying a forward rotation voltage for 65 ms; second pulse mode voltage 3 comprises pausing for 9 ms→applying a reverse rotation voltage for 20 ms→pausing for 12 ms→applying a forward rotation voltage for 59 ms; second pulse mode voltage 4 comprises pausing for 11 ms→applying a reverse rotation voltage for 23 ms→pausing for 13 ms→applying a forward rotation voltage for 53 ms; and second pulse mode voltage 5 comprises pausing for 15 ms→applying a reverse rotation voltage for 25 ms→pausing for 15 ms→applying a forward rotation voltage for 45 ms.

When the control unit 72 determines in S708 that the operating mode should be shifted to the second pulse mode (i.e., when the rate of increase in electric current is not greater than the threshold value f; S708: NO), in S710 the control unit 72 determines whether the electric current supplied to the motor 3 when applying the forward rotation voltage of the first pulse mode voltage (the falling edge) is greater than a threshold value g1. The threshold value g1 is used to determine whether a second pulse mode voltage of a higher order than the second pulse mode voltage 1 should be applied to the motor 3 and is set to 76 A in the first embodiment. Hereinafter, the electric current supplied to the motor 3 when applying the forward rotation voltage of each pulse mode voltage will be generically referred to as the reference current.

If the reference current is greater than the threshold value g1 (S710: YES), in S711 the control unit 72 determines whether the reference current is greater than a threshold value g2. The threshold value g2 is used to determine whether a second pulse mode voltage of a higher order than the second pulse mode voltage 2 should be applied to the motor 3 and is set to 77 A in the first embodiment.

If the reference current is greater than the threshold value g2 (S711: YES), in S712 the control unit 72 determines whether the reference current is greater than a threshold value g3. The threshold value g3 is used to determine whether a second pulse mode voltage of a higher order than the second pulse mode voltage 3 should be applied to the motor 3 and is set to 79 A in the first embodiment.

If the reference current is greater than the threshold value g3 (S712: YES), in S713 the control unit 72 determines whether the reference current is greater than a threshold value g4. The threshold value g4 is used to determine whether a second pulse mode voltage of a higher order than second pulse mode voltage 4 (i.e., second pulse mode voltage 5) should be applied to the motor 3 and is set to 80 A in the first embodiment.

As described above, the control unit 72 first determines which of the second pulse mode voltages to apply to the motor 3 based on the electric current flowing to the motor 3 when applying the first pulse mode voltage (forward rotation voltage) and subsequently applies the determined second pulse mode voltage to the motor 3.

For example, when the reference current is not greater than the threshold value g1 (S710: NO), in S714 the control unit 72 applies second pulse mode voltage 1 to the motor 3. When the reference current is greater than the threshold value g1 but not greater than the threshold value g2 (S711: NO), in S715 the control unit 72 applies second pulse mode voltage 2 to the motor 3. When the reference current is greater than the threshold value g2 but not greater than the threshold value g3 (S712: NO), in S716 the control unit 72 applies second pulse mode voltage 3 to the motor 3. When the reference current is greater than the threshold value g3 but not greater than the threshold value g4 (S713: NO), in S717 the control unit 72 applies second pulse mode voltage 4 to the motor 3. When the reference current is greater than the threshold value g4 (S713: YES), in S718 the control unit 72 applies second pulse mode voltage 5 to the motor 3.

After applying the second pulse mode voltage 1 (S714), in S719 the control unit 72 determines whether the reference current supplied to the motor 3 when second pulse mode voltage 1 (forward rotation voltage) was applied is greater than the threshold value g1.

If the reference current is not greater than the threshold value g1 (S719: NO), the control unit 72 returns to S707 and again determines which of the first pulse mode voltage and the second pulse mode voltage 1 should be applied to the motor 3. However, if the reference current is greater than the threshold value g1 (S719: YES), in S715 the control unit 72 applies second pulse mode voltage 2 to the motor 3.

After applying second pulse mode voltage 2 (S715), in S720 the control unit 72 determines whether the reference current supplied to the motor 3 when second pulse mode voltage 2 (forward rotation voltage) was applied is greater than the threshold value g2.

If the reference current is not greater than the threshold value g2 (S720: NO), the control unit 72 returns to S710 and again determines which of second pulse mode voltage 1 and second pulse mode voltage 2 should be applied to the motor 3. However, if the reference current is greater than the threshold value g2 (S720: YES), in S716 the control unit 72 applies second pulse mode voltage 3 to the motor 3.

After applying second pulse mode voltage 3 (S716), in S721 the control unit 72 determines whether the reference current supplied to the motor 3 when second pulse mode voltage 3 (forward rotation voltage) was applied is greater than the threshold value g3.

If the reference current is not greater than the threshold value g3 (S721: NO), the control unit 72 returns to S711 and again determines which of second pulse mode voltage 2 and second pulse mode voltage 3 should be applied to the motor 3. However, if the reference current is greater than the threshold value g3 (S721: YES), in S717 the control unit 72 applies second pulse mode voltage 4 to the motor 3.

After applying second pulse mode voltage 4 (S717), in S722 the control unit 72 determines whether the reference current supplied to the motor 3 when second pulse mode voltage 4 (forward rotation voltage) was applied is greater than the threshold value g4.

If the reference current is not greater than the threshold value g4 (S722: NO), the control unit 72 returns to S712 and again determines which of second pulse mode voltage 3 and second pulse mode voltage 4 should be applied to the motor 3. However, if the reference current is greater than the threshold value g4 (S722: YES), in S718 the control unit 72 applies second pulse mode voltage 5 to the motor 3.

After applying second pulse mode voltage 5 (S718), in S723 the control unit 72 determines whether the reference current supplied to the motor 3 when second pulse mode voltage 5 (forward rotation voltage) was applied is greater than a threshold value g5. The threshold value g5 is used to determine whether second pulse mode voltage 5 should be applied to the motor 3 and is set to 82 A in the first embodiment.

If the reference current is not greater than the threshold value g5 (S723: NO), the control unit 72 returns to S713 and again determines which of second pulse mode voltage 4 and second pulse mode voltage 5 should be applied to the motor 3. However, if the reference current is greater than the threshold value g5 (S723: YES), in S718 the control unit 72 applies second pulse mode voltage 5 to the motor 3.

Further, if the control unit 72 determines in S705 that the absolute value of electric current supplied to the motor 3 is not greater than the threshold value d (S705: NO), indicating that a bolt is being tightened, then there is no need to tighten the bolt using pressure and it is preferable to tighten with impacts in a mode that minimizes reaction force (or kickback). Hence, in this case, the control unit 72 jumps to S718 and applies second pulse mode voltage 5 to the motor 3 without going through the first pulse mode voltage and second pulse mode voltages 1-4.

In the pulse mode described above, the electronic pulse driver 1 according to the first embodiment increases the ratio of the reverse rotation period to the forward rotation period as the current (load) supplied to the motor 3 increases (i.e., decreases the forward rotation period in the first pulse mode (S706), shifts from the first pulse mode to the second pulse mode (S707), and shifts among the second pulse mode voltages 1 through 5 (S719: S722)). Therefore, the present invention can provide an impact tool that minimizes reaction force from the workpiece, achieving better handling and feel for the operator.

Also, when fastening a wood screw in the pulse mode described above, the electronic pulse driver 1 according to the first embodiment tightens the screw in the first pulse mode emphasizing a pressing force when the electric current supplied to the motor 3 is no greater than the threshold value e, and tightens the screw in the second pulse mode emphasizing an impact force when the electric current is greater than the threshold value e (S707 of FIG. 11). Accordingly, the electronic pulse driver 1 can perform tightening in the most suitable mode for wood screws.

Further, in the pulse mode described above, the electronic pulse driver 1 according to the first embodiment applies the fastener determining reverse rotation voltage to the motor 3 (S704) and determines that the fastener is a wood screw when the current supplied to the motor 3 at this time is greater than the threshold value d or a bolt when the current is less than or equal to the threshold value d (S705). Consequently, the electronic pulse driver 1 can shift to the most suitable pulse mode based on this determination to perform optimum tightening for the type of fastener.

In the pulse mode described above, when the control unit 72 determines that the rate of increase in electric current exceeds the threshold value f at the time the electric current flowing to the motor 3 rises to the threshold value e (S708: YES), the electronic pulse driver 1 of the first embodiment assumes that the wood screw is seated in the workpiece and begins applying the seated voltage to the motor 3 with a reduced switching period between the forward and reverse rotation voltages. In this way, the electronic pulse driver 1 can simultaneously reduce the subsequent reaction force from the workpiece while providing the same handling feel to the operator as a conventional electronic pulse driver that reduces impact intervals as tightening progresses.

In the pulse mode described above, the electronic pulse driver 1 according to the first embodiment shifts from the first pulse mode to the most suitable second pulse mode based on the current flowing to the motor 3 (S710-S713). Accordingly, the electronic pulse driver 1 can perform tightening using the most suitable impact mode, even when the electric current flowing to the motor 3 increases rapidly.

In the pulse mode described above, the electronic pulse driver 1 of the first embodiment can only shift to neighboring second pulse modes in terms of the length of the forward and reverse rotation switching periods (S719-S723), thereby preventing a sudden change in handling.

The electronic pulse driver 1 according to the first embodiment applies the fitting reverse rotation voltage to the motor 3 before applying the fastening forward rotation voltage, rotating the motor 3 in reverse until the hammer 42 collides with the anvil 52 (S601 in FIG. 10). Therefore, even when the end tool is not properly seated in the fastener head, the electronic pulse driver 1 can firmly fit the end tool in the fastener head prior to tightening in order to prevent the end tool from coming unseated during the tightening operation.

In the clutch mode described above, the electronic pulse driver 1 according to the first embodiment applies the prestart forward rotation voltage to the motor 3 prior to applying the fastening forward rotation voltage to place the hammer 42 in contact with the anvil 52 (S602 in FIG. 10). Accordingly, the electronic pulse driver 1 can prevent the hammer 42 from providing the fastener with torque exceeding the target torque when impacting the anvil 52.

In the clutch mode described above, the electronic pulse driver 1 according to the first embodiment halts the pseudo-clutch a prescribed interval after producing the same (S612 of FIG. 10). Therefore, the electronic pulse driver 1 can minimize increases in temperature and power consumption.

In the clutch mode described above, the electronic pulse driver 1 according to the first embodiment applies the braking reverse rotation voltage to the motor 3 at the time the torque for tightening a bolt reaches the target torque (S607 in FIG. 10). Hence, even when tightening a fastener such as a bolt for which torque increases abruptly just before the target torque, the electronic pulse driver 1 can prevent the application of excessive torque caused by inertial force, thereby faithfully providing the target torque.

Next, an electronic pulse driver 201 according to a second embodiment of the present example will be described with reference to FIGS. 12 and 13.

The electronic pulse driver 1 described in the first embodiment varied the impact mode when electric current or the like rose to predetermined threshold values, without considering changes in temperature. However, since the viscosity of grease in the gear mechanism 41 drops under cold temperatures, for example, electric current flowing to the motor 3 would have a stronger tendency to increase. In such an environment, the current flowing to the motor 3 would more easily exceed the threshold values, causing the electronic pulse driver 1 to vary the impact modes too early.

Therefore, a feature of the second embodiment is to modify the threshold values to account for changes in temperature. Specifically, a temperature detection unit is provided on the switching board 63 for detecting temperature, and the control unit 72 modifies each threshold value based on the temperature detected by the temperature detection unit.

Figure 12:
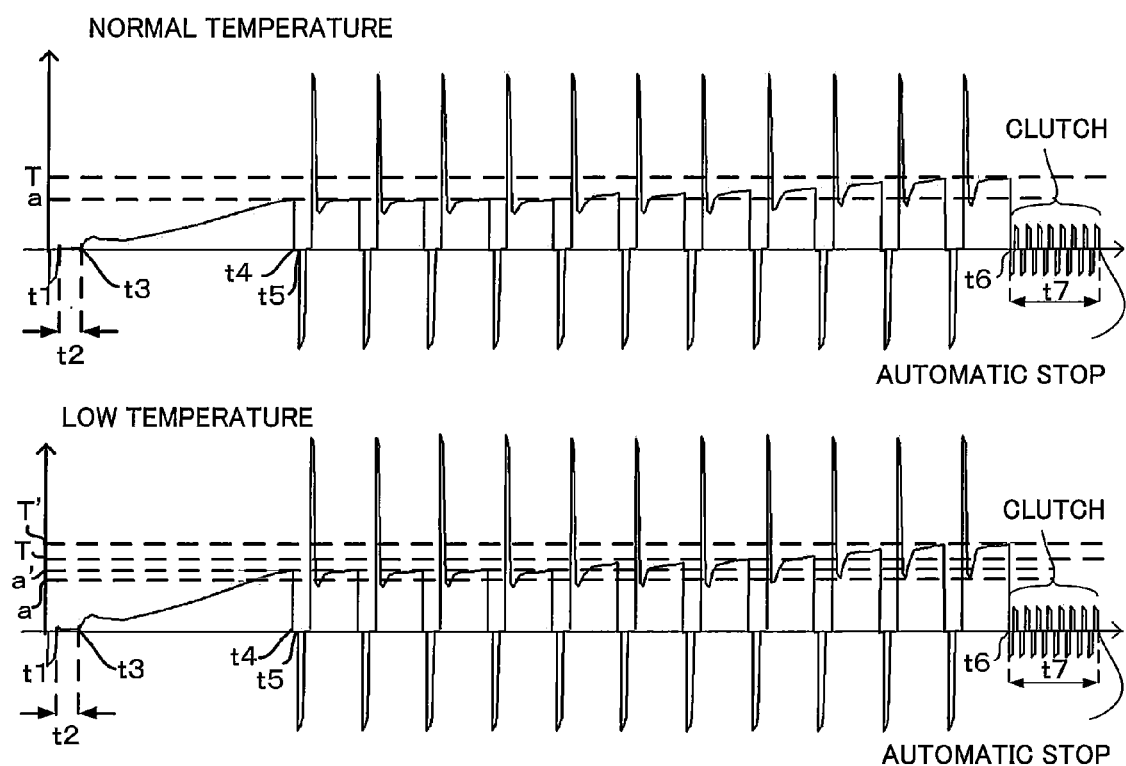
FIG. 12 is graphs illustrating how threshold values are modified when tightening a wood screw in a clutch mode according to a second embodiment of the present invention.
Figure 13:
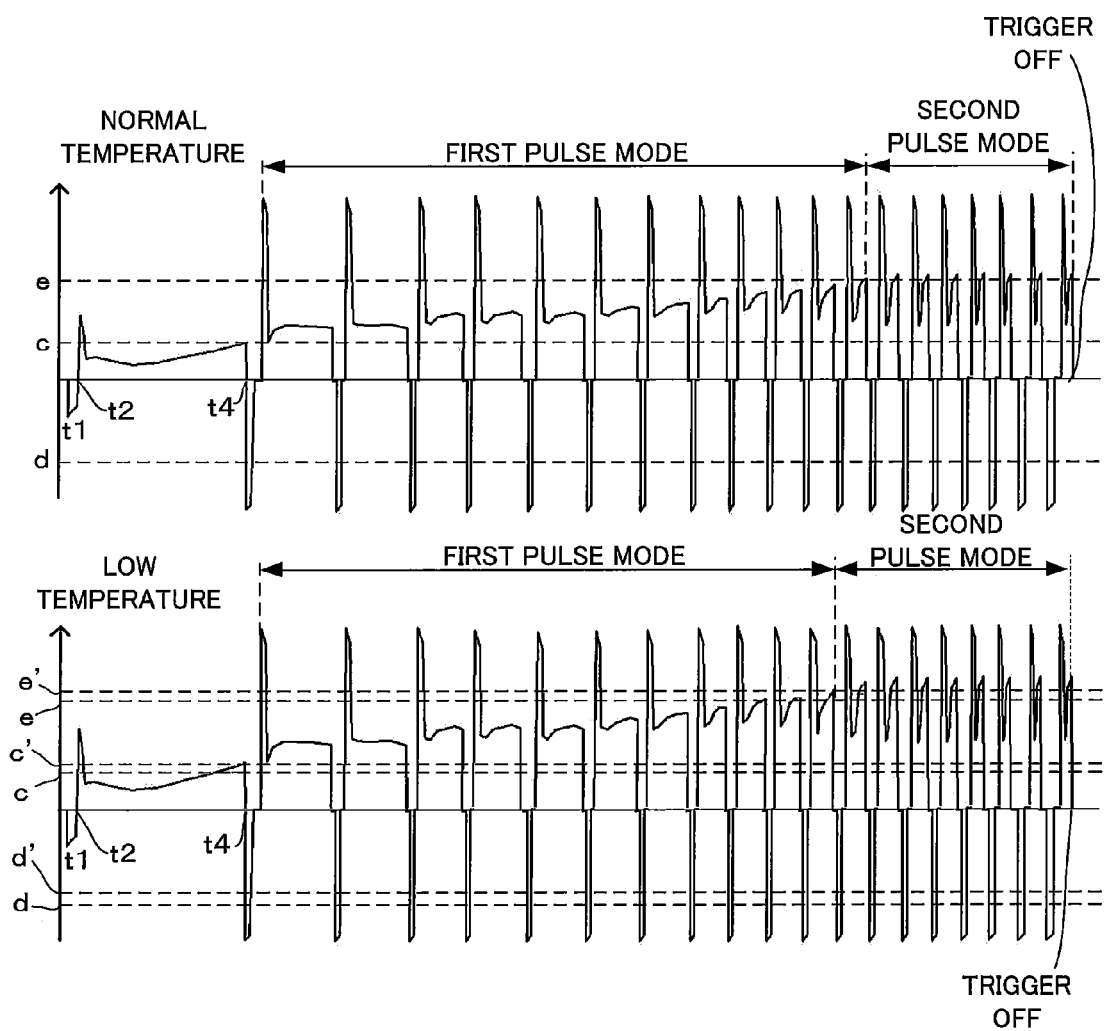
FIG. 13 is graphs illustrating how threshold values are modified when tightening a wood screw in a pulse mode according to the second embodiment.

FIG. 12 illustrates how the threshold values are modified when tightening a wood screw in the clutch mode. FIG. 13 illustrates how threshold values are modified when tightening a wood screw in the pulse mode.

In the example of FIG. 12, the control unit 72 sets a threshold value a' and a target current T' to values higher than the threshold value a and the target current T for applying an anti-stripping reverse rotation voltage under normal temperatures. Further, as shown in FIG. 13, the control unit 72 sets a threshold value c' for shifting to the first pulse mode and a threshold value e' for shifting to the second pulse mode under low temperatures to values higher than the corresponding threshold value c and the threshold value e used under normal temperatures.

By modifying these threshold values to account for changes in temperature in this way, the electronic pulse driver 201 of the second embodiment can change the impact mode to suit the conditions. Note that other threshold values may be modified based on changes in temperature, and not just the threshold values described above. Further, a temperature detection unit may be provided in a location other than near the motor 3.

Next, an electronic pulse driver 301 according to a third embodiment of the present invention will be described with reference to FIG. 14.

In the second embodiment described above, the electronic pulse driver 201 modifies threshold values with priority for performance. In the third embodiment, the electronic pulse driver 301 modifies the periods for shifting between forward and reverse rotations with priority for the long service life of the electronic pulse driver 301.

As described in the second embodiment, a temperature detection unit is provided near the motor 3 in the third embodiment for detecting temperature, and the control unit 72 modifies the periods for switching between forward rotations and reverse rotations based on the temperature detected by the temperature detection unit. The temperature detection unit may also be provided in a location other than near the motor 3.

Figure 14:
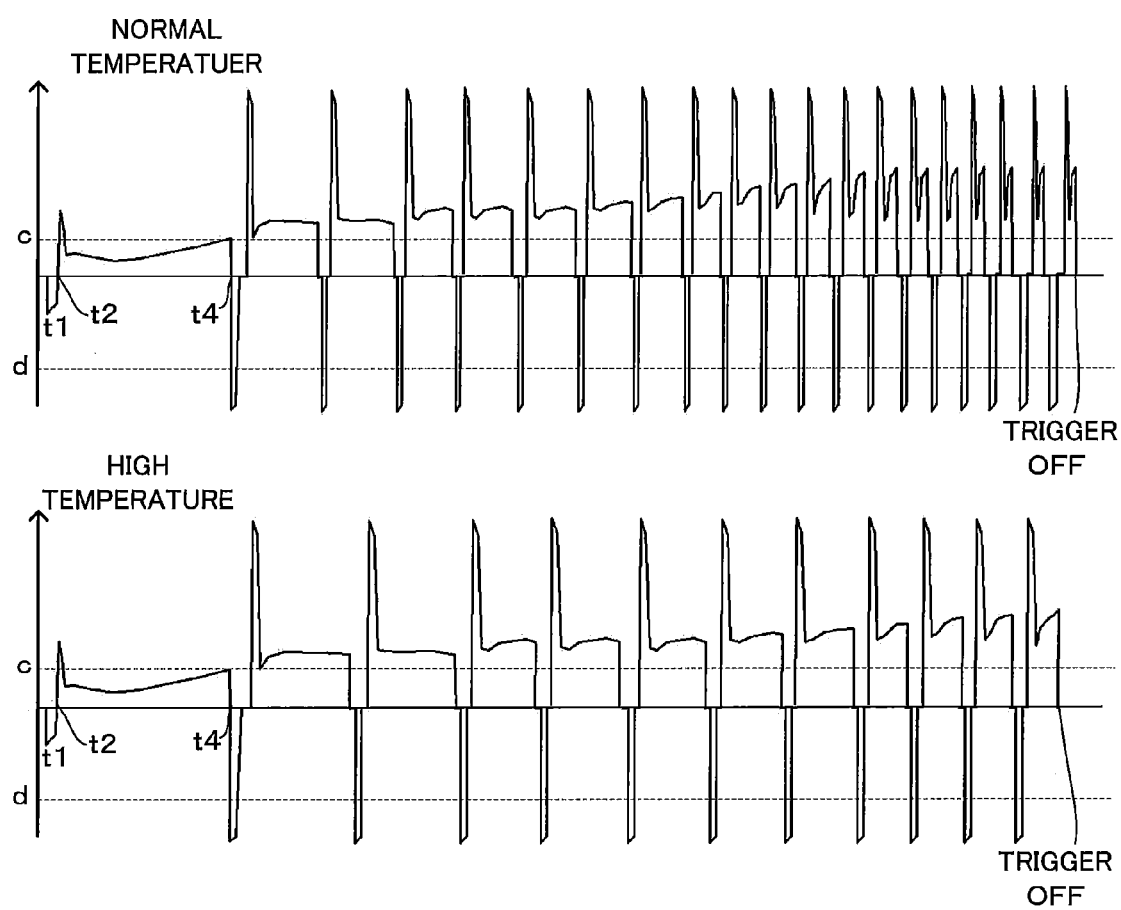
FIG. 14 is graphs illustrating how periods for switching between forward and reverse rotations are modified when tightening a wood screw in a pulse mode according to a third embodiment of the present invention.

FIG. 14 illustrates how the control unit 72 modifies the periods for switching between forward and reverse rotations when tightening a wood screw in the pulse mode.

In the example shown in FIG. 14, the control unit 72 sets the periods for switching between forward and reverse rotations in the first pulse mode under high temperatures longer than the periods for switching between forward and reverse rotations in the first pulse mode under normal temperatures. With this configuration, the control unit 72 can minimize the heat generated when switching the direction of rotation, thereby minimizing damage to the electronic pulse driver 301 caused by high temperatures in the FETs. This configuration can also suppress heat damage to the shielding of the stator coils, increasing the overall service life of the electronic pulse driver 301.

Next, an electronic pulse driver 401 according to a fourth embodiment of the present invention will be described with reference to FIGS. 16 and 17, wherein like parts and components to the electronic pulse driver 1 according to the first embodiment are designated with the same reference numerals to avoid duplicating description.

Figure 16:
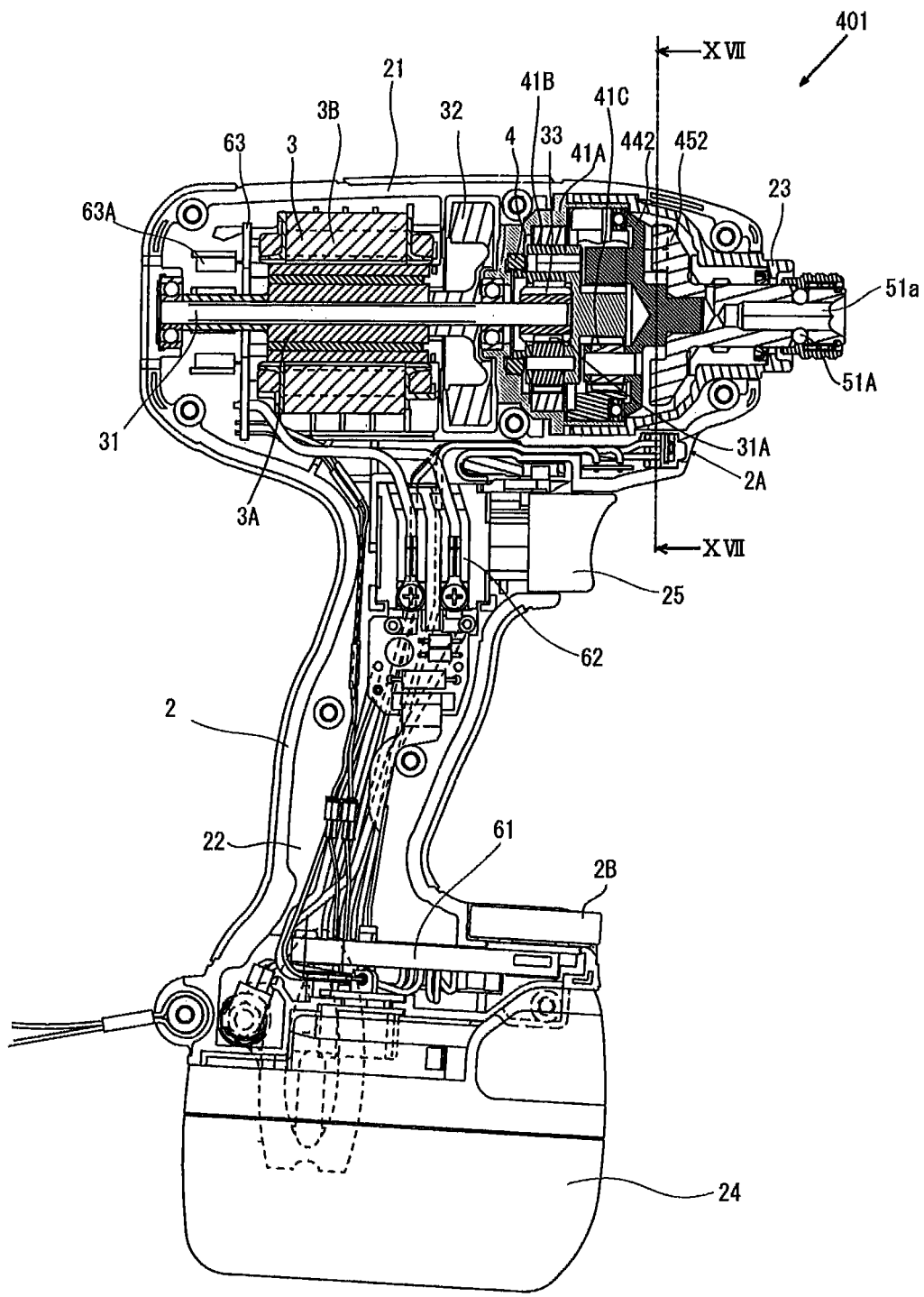
FIG. 16 is a cross-sectional view of an electronic pulse driver according to a fourth embodiment of the present invention.

As shown in FIG. 16, the electronic pulse driver 401 includes a hammer 442, and an anvil 452. In the electronic pulse driver 1 according to the first embodiment, the angle of clearance between the hammer 42 and anvil 52 in the rotating direction is approximately 315 degrees. In the electronic pulse driver 401 according to the fourth embodiment, the angle of clearance between the hammer 442 and anvil 452 in their rotating direction is set to approximately 135 degrees.

Figure 17:
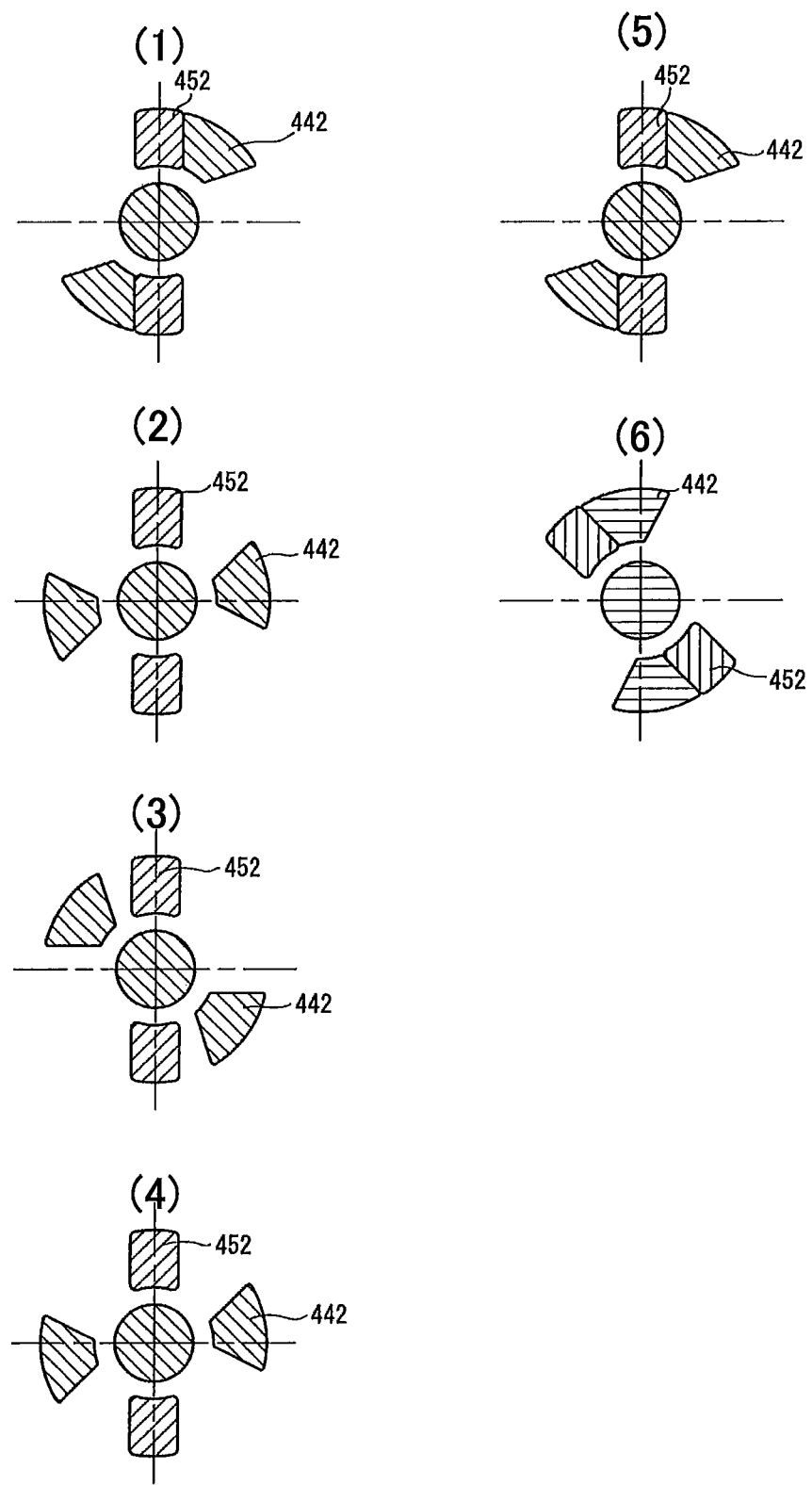
FIG. 17 is a cross-sectional views of the electronic pulse driver taken along the plane and viewed in the direction indicated by the arrows X VII in FIG. 16 according to the fourth embodiment.

FIG. 17 shows cross-sectional views of the electronic pulse driver 401 taken along the plane and viewed in the direction indicated by the arrows XVII in FIG. 16. The cross-sectional views in FIG. 17 illustrate the positional relationship between the hammer 442 and the anvil 452 when the electronic pulse driver 401 is operating. FIG. 17(1) shows the state of the hammer 442 in contact with the anvil 452. From this state, the hammer 442 is rotated in reverse through the state shown in FIG. 17(2) to the maximum rotation point relative to the anvil 452 shown in FIG. 17(3). As the motor 3 rotates forward, the hammer 442 passes through the state shown in FIG. 17(4) and collides with the anvil 452, as shown in FIG. 17(5). The force of impact rotates the anvil 452 counterclockwise in FIG. 17 to the state shown in FIG. 17(6).

Here, the values of voltage, current, and duration described in the first embodiment can be modified to suit the electronic pulse driver 401 of the fourth embodiment.

Figure 19:
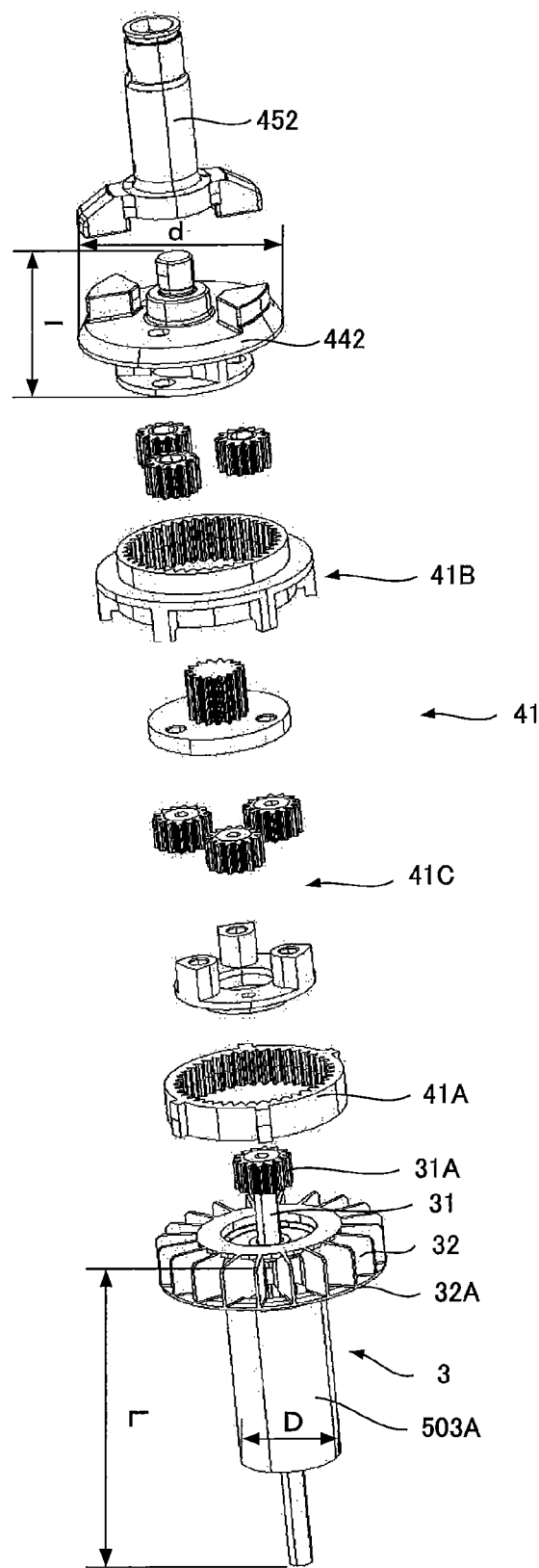
FIG. 19 is a exploded perspective view ambient to a gear mechanism according to a fifth embodiment of the present invention.

Next, an electronic pulse driver 501 according to a fifth embodiment of the present invention will be described with reference to FIGS. 19 and 24, wherein like parts and components to the electronic pulse drivers 1 and 401 according to the first and the fourth embodiments are designated with the same reference numerals to avoid duplicating description.

Figure 20:
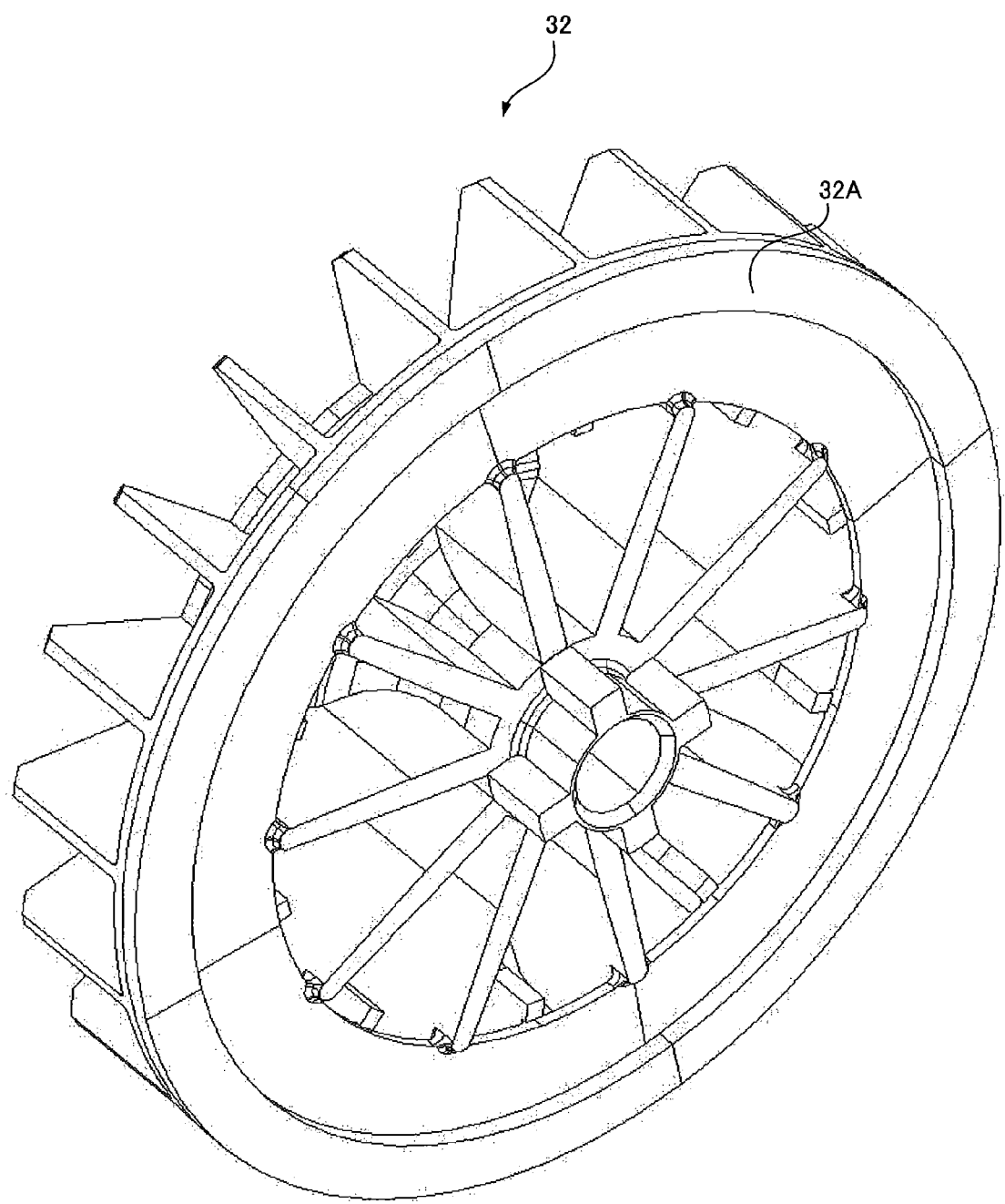
FIG. 20 is a rear perspective view of a fan according to the fifth embodiment.

Generally, a kinetic energy K possessed by a rotating body is expressed by the equation $K=I\omega^2/2$. Therefore, the number of rotations of the motor 3 can be made higher than the number of rotations of the hammer 442 by employing the gear mechanism 41 disposed between the motor 3 and the hammer 442. In order to increase the rotational kinetic energy K, a rotational inertial Im of the motor 3 is set greater than a rotational inertial Ih of the hammer 442. In the fifth embodiment, a generally annular spindle 32A is provided on the rear side of the fan 32 along the outer peripheral edge thereof, as shown in FIG. 20, and the weight and diameter of a rotor 503A of the motor 3 are increased in order to generate a larger rotational inertial Im on the motor 3 side than the rotational inertial Ih of the hammer 442. In the fifth embodiment, the diameter D of the rotor 503A is set to 22 mm, while the diameter d of the hammer 442 is set to 45 mm. Further, the length L of the rotor 503A in the front-to-rear direction (37.1 mm) is set longer than the length I of the hammer 442 in the front-to-rear direction (26.6 mm). Through these settings, the rotational inertial Im on the motor 3 side is greater than the rotational inertial Ih of the hammer 442. With this configuration, the size of the hammer 442 can be minimized and a more compact power tool can be achieved. Specifically, the rotational inertial Im of the motor 3 is set to 5.8×10-6 kg·m2, the number of rotations of the motor 3 is set between 0 and 17,000 rpm, the rotational inertial Ih of the hammer 442 is set to 1.1×10-5 kg·m2, and the number of rotations of the hammer 442 is set between 0 and 1,100 rpm.

Further, the minimum required ratio of rotational inertias during the drill mode is Im:Ih=118:1, while the minimum required ratio during the pulse mode is Im:Ih=10:1. By reducing the size of the hammer 442 to an extent capable of meeting these ratios, it is possible to make the entire electronic pulse driver 501 more compact.

Since the electronic pulse driver 1 according to the first embodiment performs the prestart operation for a predetermined period of time regardless of the distance (positional relationship) between the hammer 42 and the anvil 52, the electronic pulse driver 1 takes an excessive amount of time before beginning actual fastening operations. Further, the electronic pulse driver 1 performs the prestart operation even when the prestart operation is not needed, e.g., when the hammer 42 is already in contact with the anvil 52.

Therefore, since the prestart operation takes a fixed time to perform, the operator loses this time when waiting to begin the fastening operation.

To resolve this problem, the electronic pulse driver 501 according to the fifth embodiment modifies the duration of the prestart operation based on the positional relationship between the hammer 442 and anvil 452. Specifically, as shown in FIG. 22, the control unit 72 determines that the hammer 442 is in contact with the anvil 452 (detects a load) when the number of rotations of the motor 3 is less than a threshold value n (200 rpm, for example). At this time, the control unit 72 ends the prestart operation and shifts to the next control process, such as a soft start operation described later. The number of rotations of the motor 3 is constant during the prestart operation and the number of rotations of the motor 3 is gradually increased during the soft start operation.

Through this process, the control unit 72 can end the prestart operation and shift to the next control process more quickly when a circumferential distance between the hammer 442 and anvil 452 is indicated in FIGS. 22 (2) and (3) of than when the circumferential distance is indicated in FIG. 22 (1). In the fifth embodiment, the control unit 72 detects an increase in load on the motor 3 (indicating contact between the hammer 442 and the anvil 452) based on a drop in the number of rotations of the motor 3, but the control unit 72 may detect an increase in load based on an increase in the electric current instead.

Figure 21:
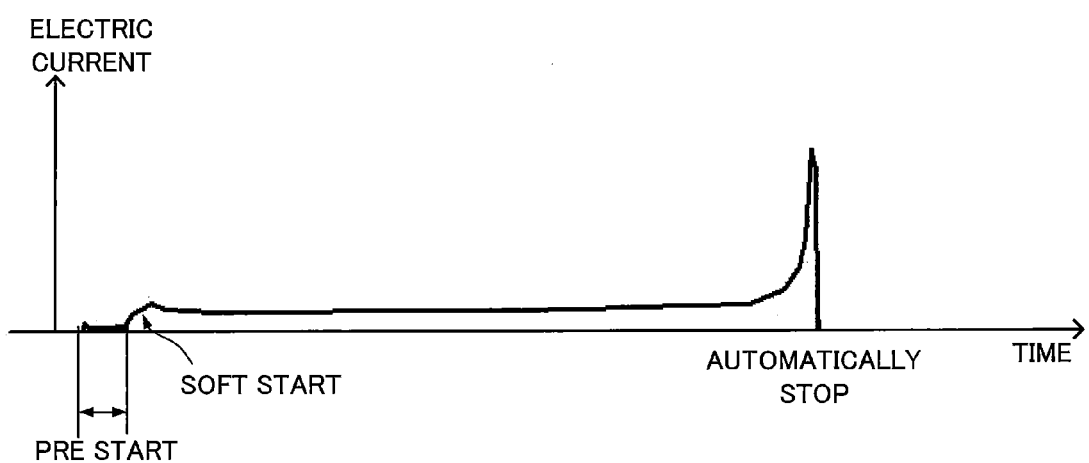
FIG. 21 is a graph illustrating a control process of an electronic pulse driver when a fastener is tightened in a drill mode according to the fifth embodiment.

As shown in FIGS. 21 and 22, the control unit 72 shifts to the soft start operation after completing the prestart operation, and shifts to normal control after completing the soft start operation. The control unit 72 automatically cuts off the power supply to the motor 3 when the electric current supplied to the motor 3 increases to a target current (a target torque set by adjusting the dial 2B). The soft start operation is a control process for gradually increasing the duty cycle of the PWM signal to a target value at a fixed rate of increase in order to prevent the generation of an excessive starting current when the motor 3 is actuated. In the fifth embodiment, the control unit 72 performs the soft start operation between the prestart operation and normal control, but the control unit 72 may also shift directly to normal control following the prestart operation without performing the soft start operation.

Next, a control process for loosening a fastener in the clutch mode (rotating the hammer 442 in reverse) will be described with reference to FIG. 23. In the example shown in FIG. 23, the hammer 442 and the anvil 452 are shaped so that they will contact each other at only one point along the circumferential direction similarly to the first embodiment.

Figure 23:
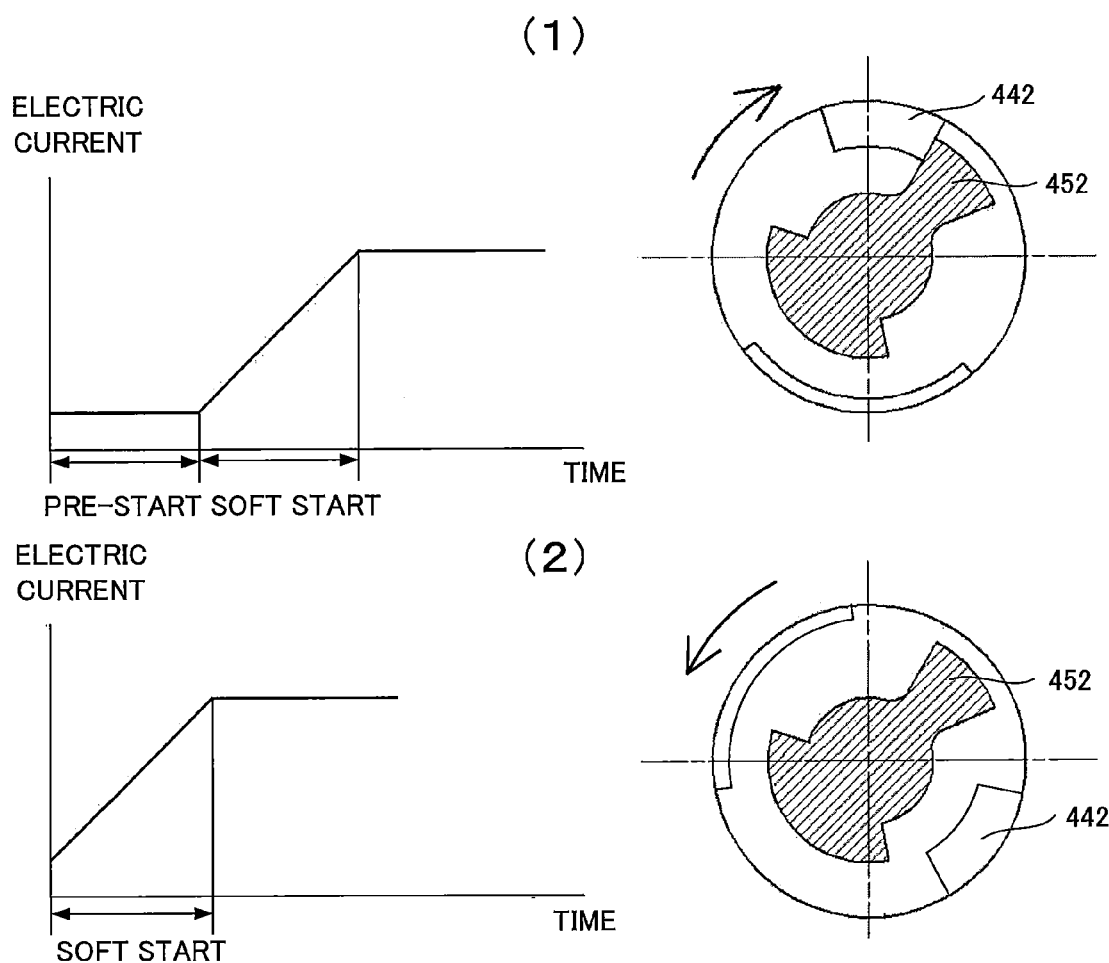
FIG. 23(1) is a diagram illustrating an initial control process of the electronic pulse driver when a motor is rotated in a forward direction, and FIG. 23(2) is a diagram illustrating the initial control process of the electronic pulse driver when the motor is rotated in the reverse direction.

As described above, when the electronic pulse driver 501 is tightening a bolt (rotating the hammer 442 clockwise in FIG. 23), the control unit 72 places the hammer 442 in contact with the anvil 452 in the prestart operation, as shown in FIG. 23(1), and subsequently shifts to the soft start operation. However, when loosening the bolt in the fifth embodiment (rotating the hammer 442 counterclockwise in FIG. 23), the control unit 72 omits the prestart operation, as shown in FIG. 23(2). As a result, the rotational speed of the hammer immediately before contacting the anvil is greater when the hammer is rotated in the reverse direction than when the hammer is rotated in the forward direction, i.e., the control unit 72 supplies to the motor the electric power which is greater when the hammer is initially rotated in the reverse direction than when the hammer is initially rotated in the forward direction.

In some cases, a tightened bolt cannot be loosened by applying the same force used for tightening the bolt, due to rust or other factors. In other cases, a screw cannot be loosened because the coefficient of kinetic friction between the screw and the workpiece during the fastening operation is less than the coefficient of static friction between the screw and the workpiece when attempting to loosen the screw. However, the electronic pulse driver 501 according to the fifth embodiment accelerates the hammer 442 for striking the anvil 452 during the soft start operation when the hammer 442 is rotated in the reverse direction. Accordingly, the electronic pulse driver 501 can reliably loosen a bolt or a screw even when the torque of the electronic pulse driver 501 is set to the same value for tightening and loosening. Although the loosening operation in FIG. 23(2) begins with the soft start operation, the fastening operation may start directly from normal control, i.e., the soft start operation may be omitted.

Next, a control process during the pulse mode according to the fifth embodiment will be described with reference to FIG. 24.

Figure 24:
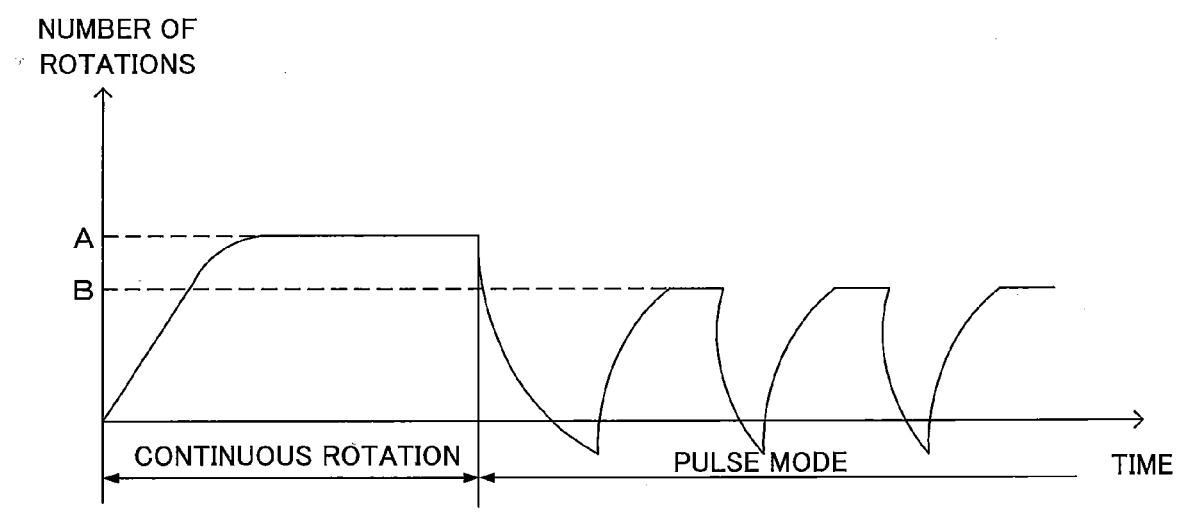
FIG. 24 is a graph illustrating the control process for tightening a fastener in a pulse mode.

FIG. 24 is a graph illustrating the control process when a bolt is tightened in the pulse mode. When the operating mode of the electronic pulse driver 501 is set to the pulse mode and the operator squeezes the trigger 25, the control unit 72 drives the motor 3 continuously at a number of rotations A (17,000 rpm, for example). When the torque of the motor 3 reaches the prescribed value, the control unit 72 shifts the electronic pulse driver 501 into the pulse mode and begins driving the motor 3 in alternating forward and reverse directions. Since the pulse mode is used for applying a tightening force to the fastener through impacts, the bit can easily become unseated from a head of the fastener when the electronic pulse driver 501 shifts from continuous rotation to the pulse mode. Therefore, in the pulse mode, the electronic pulse driver 501 rotates the motor 3 in the forward direction at a number of rotations B (10,000 rpm, for example), which is lower than the number of rotations A. This configuration reduces the torque applied to the bit, preventing the bit from coming unseated from the head of the fastener when the electronic pulse driver 501 shifts to the pulse mode. In the pulse mode, the electronic pulse driver 501 alternates between forward and reverse rotations, but the electronic pulse driver 501 may instead alternate between a forward rotation and a halted state, for example, provided that the motor 3 is driven to rotate intermittently in the forward direction.

Figure 26:
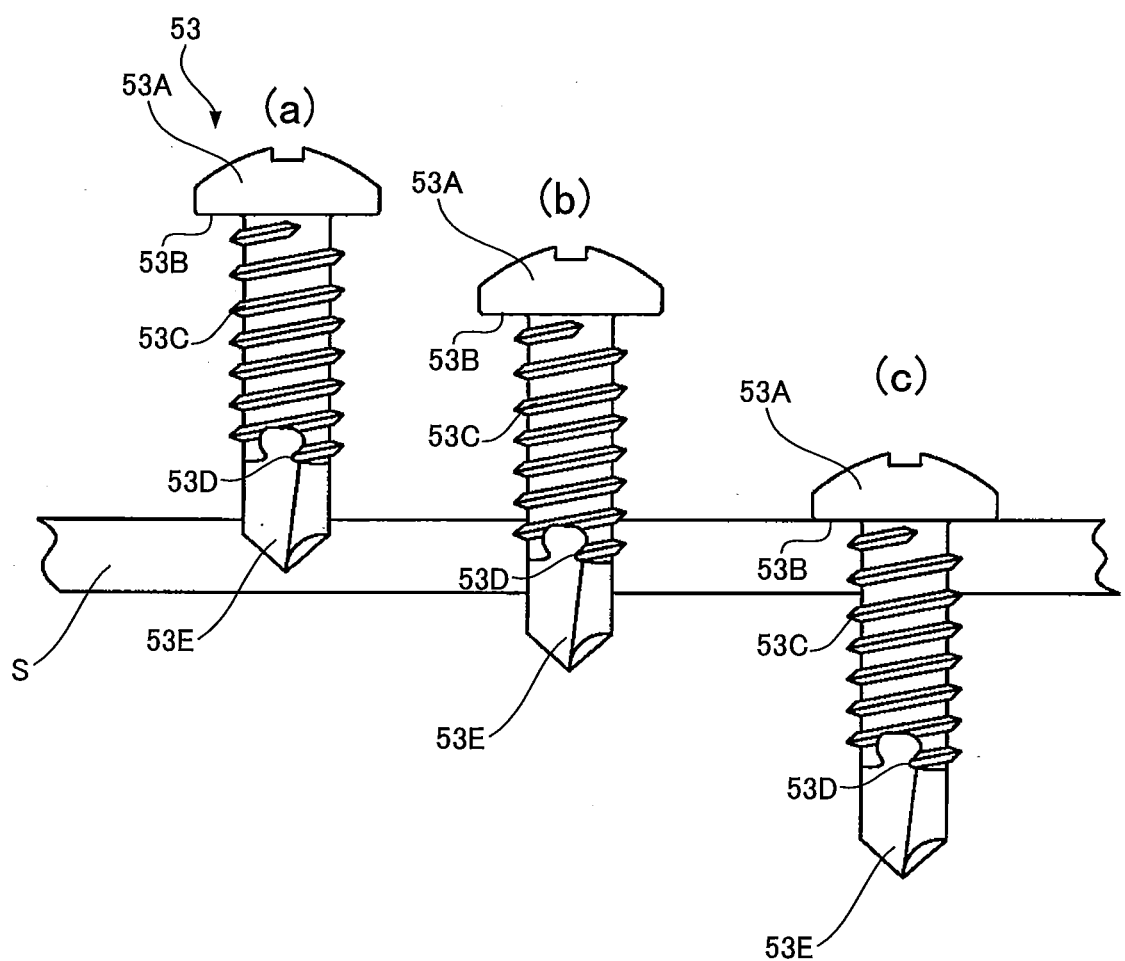
FIG. 26 is a diagram showing various states of the self-drilling screw as the self-drilling screw is tightened in a steel sheet in the pulse mode according to the sixth embodiment.

Next, an electronic pulse driver 601 according to a sixth embodiment of the present invention will be described with reference to FIGS. 25 and 26.

FIG. 25 is a graph illustrating the control process performed for screwing a self-drilling screw 53 into a steel sheet S in the pulse mode. FIG. 26 shows various states of the self-drilling screw 53 as the self-drilling screw 53 is tightened in the steel sheet S in the pulse mode. The self-drilling screw 53 has a drill-bit-like blade on its tip for drilling a hole in the steel sheet S. As shown in FIG. 26, the self-drilling screw 53 is configured of a screw head 53A, a bearing surface 53B, a threaded part 53C, a thread tip 53D, and a drill part 53E.

In the pulse mode of the sixth embodiments, the control unit 72 performs PWM control in order to vary the number of rotations of the motor 3. When the operator first squeezes the trigger 25 (t1 in FIG. 25), the control unit 72 begins driving the motor 3 at the number of rotations a. Since the electronic pulse driver 601 does not emphasize tightening at a proper torque in the pulse mode, steps corresponding to the prestart operation described for the clutch mode are not performed. The steps indicating the soft start operation have also been omitted from FIG. 25 for simplification.

Since the drill part 53E of the self-drilling screw 53 must drill a pilot hole in the steel sheet S when the drill part 53E comes into contact with the steel sheet S, as shown in FIG. 26(a), the control unit 72 drives the motor 3 to rotate at the high number of rotations a (17,000 rpm, for example), as shown in FIG. 25. After the tip of the self-drilling screw 53 advances into the steel sheet S far enough that the thread tip 53D reaches the steel sheet S, the friction generated between the threaded part 53C and the steel sheet S produces resistance that increases the electric current (see FIG. 25 and FIG. 26(b)). Once the electric current surpasses the threshold value C (11 A, for example), the control unit 72 shifts the operating mode to the first pulse mode for repeatedly alternating between forward and reverse rotations (t2 in FIG. 25).

In the first pulse mode of the sixth embodiment, the control unit 72 drives the motor 3 in the forward direction at the number of rotations b (6,000 rpm, for example), which is lower than the number of rotations a (FIG. 25(2)). When the bearing surface 53B becomes seated on the steel sheet S (FIG. 26(c)), the electric current value increases abruptly. In the sixth embodiment, the control unit 72 shifts to the second pulse mode when the rate of increase in electric current exceeds a prescribed value (t3 in FIG. 25).

In the second pulse mode, the control unit 72 drives the motor 3 in the forward rotation at the threshold value c (3,000 rpm, for example), which is lower than the number of rotations b. Through this control, the electronic pulse driver 601 can avoid breaking or stripping the head of the self-drilling screw 53 due to the bit applying excessive torque to the same.

While the electronic pulse driver of the invention has been described in detail with reference to specific embodiments thereof, it would be apparent to those skilled in the art that many modifications and variations may be made therein without departing from the spirit of the invention, the scope of which is defined by the attached claims.

Figure 15:
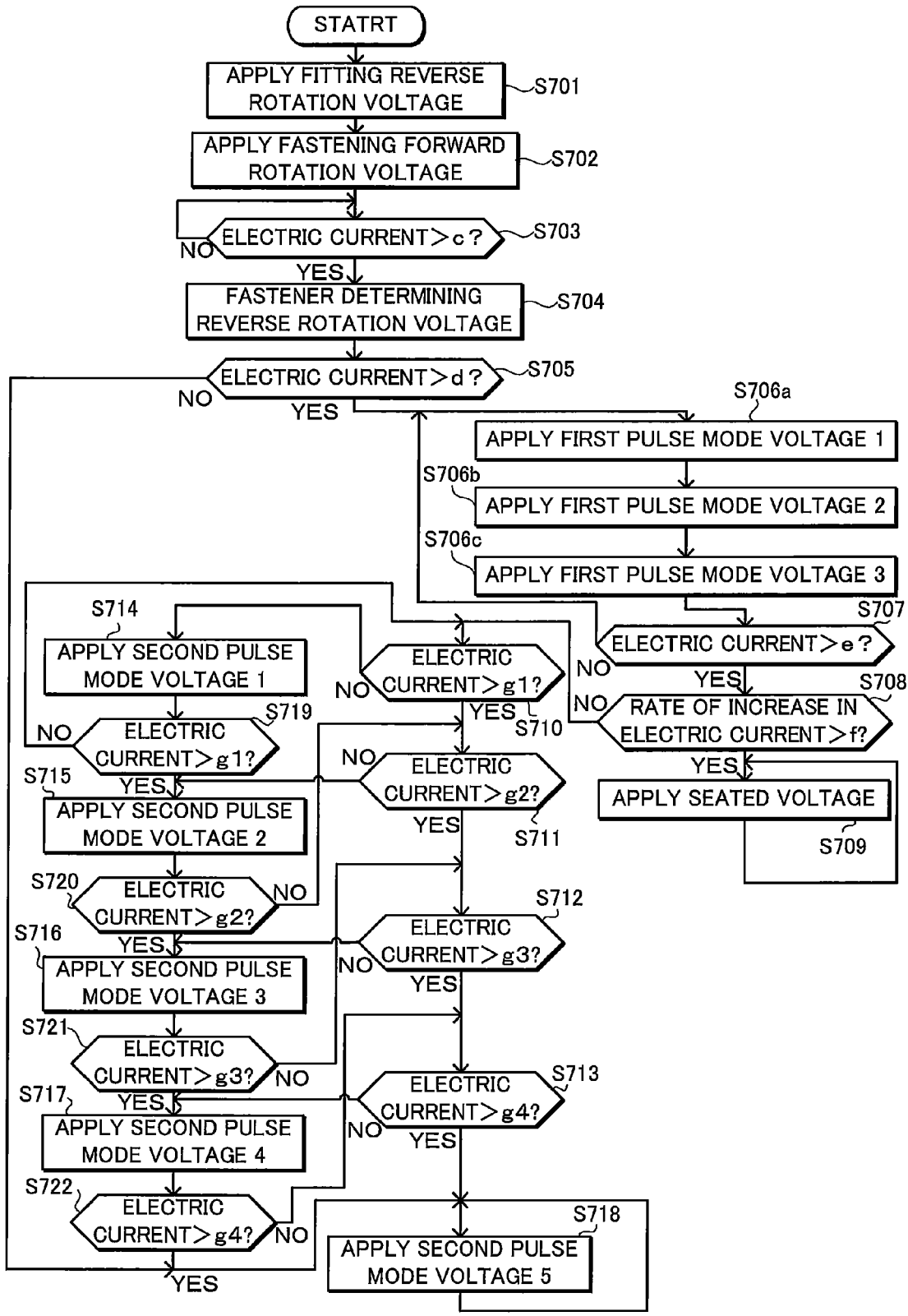
FIG. 15 is a flowchart illustrating steps in the control process when tightening a fastener in a pulse mode according to a first modification of the present invention.

When shifting between second pulse mode voltages 1-5 in the first embodiment, the control unit 72 considers cases for returning to earlier second pulse mode voltage in the sequence (S719-S723: NO in FIG. 11). However, comfortable handling and feel for the operator can be achieved according to a first modification of the present invention, as illustrated in the flowchart of FIG. 15. In the first modification, the second pulse mode voltages do not return to previous second pulse mode voltages and repeatedly performs the same second pulse mode voltages.

Figure 18:
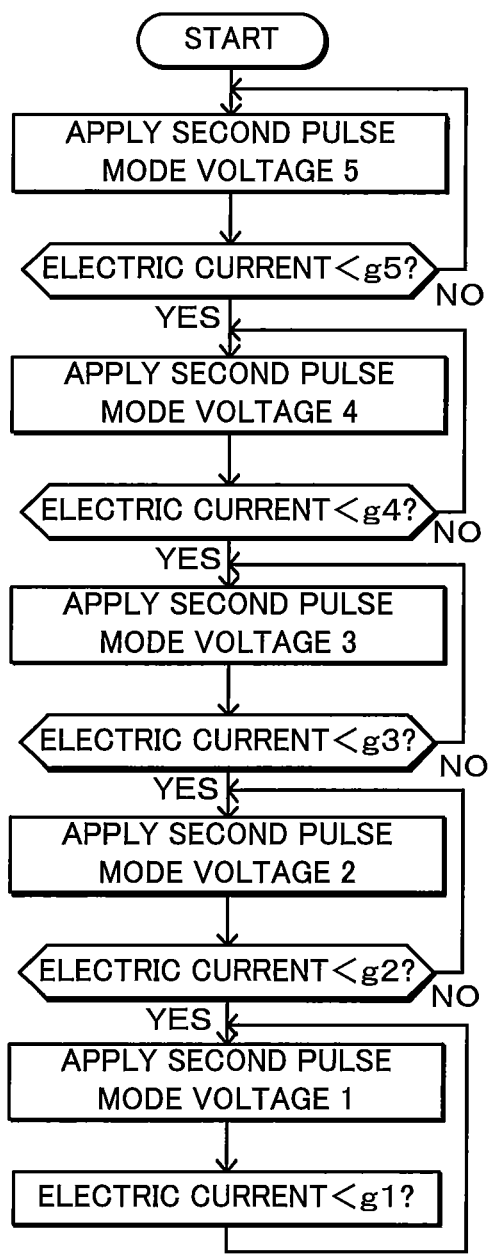
FIG. 18 is a flowchart illustrating steps in a control process when tightening a fastener in a pulse mode according to the fourth embodiment.

Further, while the first embodiment describes control for tightening wood screws or bolts, the concept of the present invention may also be used when loosening (removing) the same. The flowchart in FIG. 18 illustrates steps for loosening a wood screw or the like. At the beginning of this process, the control unit 72 applies the second pulse mode voltage 5 having the longest reverse rotation period, and subsequently steps down through each second pulse mode voltage to the second pulse mode voltage 1 as the electric current drops below each successive threshold value. This process can provide the operator with comfortable handling while loosening wood screws or the like.

In the first embodiment described above, the control unit 72 determines the type of fastener in S705 of FIG. 11 based on the electric current flowing to the motor 3 after applying the fastener determining reverse rotation voltage. However, this determination may be made based on the rotating speed of the motor 3 or the like.

Further, in the first embodiment described above, the same threshold values g1-g4 are used in the respective steps S719-S722 and S710-S713 of FIG. 11, but different values may be used.

Since only one anvil 52 is provided in the electronic pulse driver 1 of the first embodiment, the anvil 52 and hammer 42 may be separated by a maximum of 315 degrees, but another anvil may be provided in between these components. With this construction, it is possible to reduce the time required for applying the fitting reverse rotation voltage (S601 of FIG. 10 and S701 of FIG. 11) and the time required for applying the prestart forward rotation voltage (S602 of FIG. 10).

In the first embodiment described above, the hammer 42 is placed in contact with the anvil 52 by applying the prestart forward rotation voltage, but it is not necessary to place the hammer 42 in contact with the anvil 52. A variation of this process may be implemented, provided that the initial position of the hammer 42 relative to the anvil 52 is fixed.

The electric power tool of the present invention is configured to rotate the hammer in forward and reverse directions, but the present invention is not limited to this configuration. For example, the hammer may be configured to strike the anvil by continuously being driven in a forward direction.

The electric power tool of the present invention drives the hammer with an electric motor powered by a rechargeable battery, but the hammer may be driven by a power supply other than an electric motor, such as an engine. Further, the electric motor may be driven by fuel cells, solar cells, or the like.

The control process for loosening (rotating in reverse) a fastener in the clutch mode described in the fifth embodiment may be implemented according to a different method. The graphs in FIG. 27 illustrate a second modification of the control process in the clutch mode. Graph (1) in FIG. 27 shows control when driving the motor 3 in the forward direction, while graph (2) in FIG. 27 illustrates control when driving the motor 3 in the reverse direction.

As shown in FIG. 27, an electronic pulse driver 701 according to the second modification supplies power to the motor 3 with a larger PWM duty cycle during reverse rotation than during forward rotation. As a result, the hammer 442 impacts the anvil 452 more strongly in the reverse rotation than in the forward rotation, facilitating loosening of the bolt. However, the PWM duty cycle for the reverse rotation is set within a range that does not produce overcurrent.

Instead of increasing the PWM duty cycle as described above, the electronic pulse driver 701 may be provided with a capacitor for storing electric charge and may simply supply the stored power to the motor 3 during reverse rotation in order to increase the amount of power supply and, hence, increase the number of rotations of the motor 3. Further, the electronic pulse driver 701 may perform a control process so that the angle at which the hammer 442 rotates to contact the anvil 452 is larger for reverse rotation than for forward rotation. That is, by rotating the motor 3 forward for a very small time before driving the motor 3 in reverse, the electronic pulse driver 701 can increase the angle between the hammer 442 and the anvil 452 (acceleration distance) so that the hammer 442 more strongly impacts the anvil 452.

REFERENCE SIGNS LIST 1 electrical pulse driver
2 housing 2A light
2B dial
3 motor
3A rotor
3B stator
4 hammer unit
5 anvil unit
6 switching mechanism
21 body section
22 handle section
23 hammer case
23A bearing metal
23a opening
24 battery
25 trigger
31 output shaft
32 fan
41 gear mechanism
41A outer ring gear
41B planetary gear mechanism
41C planetary gear mechanism
42, 442 hammer
42A first engaging protrusion
42B second engaging protrusion
51 end tool mounting part
51A chuck
51a insertion hole
52, 452 anvil
52A first engagement protrusion
52B second engagement protrusion
61 circuit board
62 trigger switch
63 switching board
64 hall element
65 control signal output circuit
66 inverter circuit
67 arithmetic unit
68 rotating direction setting circuit
69 rotor position detection circuit
70 applied voltage setting circuit
71 current detection circuit
72 control unit
73 impact force detection sensor
74 impact detection circuit
75 rotating speed detection circuit
76 switch operation detection circuit

The invention claimed is:
1. An electric power tool comprising:
an electric motor;
a hammer drivingly connected to the electric motor and rotatable by the electric motor;
an anvil rotatable relative to the hammer;
a trigger having an operational stroke range through which the trigger can be operated to place the trigger at a selected stroke;
a switching part configured to be operated to select one from among a plurality of modes as an operating mode of the electric power tool, the plurality of modes including a first mode and a second mode;
switching elements operable to control supply of electric power to the electric motor; and
a control unit connected to the trigger, the switching part, and the switching elements, the control unit being configured to:
in a case where the first mode is selected through operation of the switching part,
when the trigger is operated, control the switching elements to apply a prestart voltage until the hammer is brought into contact with the anvil in a rotational direction of the hammer, the prestart voltage being restricted to a predetermined upper limit irrespective of the selected stroke of the trigger to the electric motor,
subsequent to controlling the switching elements to apply the prestart voltage to the electric motor, control the switching elements to apply to the electric motor a selected voltage, greater than the prestart voltage, based upon the selected stroke of the trigger, and
when an electric current supplied to the electric motor exceeds a target current, halt driving of the electric motor; and
in a case where the second mode is selected through operation of the switching part,
when the trigger is operated, the control unit omits application of the prestart voltage to the motor and controls the switching elements to apply to the electric motor the selected voltage based upon the selected stroke of the trigger.
2. The electric power tool according to claim 1, wherein the control unit is further configured to perform a soft start operation after applying the prestart voltage to the electric motor.
3. An electric power tool comprising:
an electric motor;
a trigger having an operational stroke range through which the trigger can be operated to place the trigger at a selected stroke;
a hammer drivingly connected to the electric motor and rotatable by the electric motor;
an anvil rotatable relative to the hammer;
a switching part configured to be operated to select one from among a plurality of modes as an operating mode of the electric power tool, the plurality of modes including a first mode and a second mode; and
a control unit connected to the trigger and the switching part, the control unit being configured to:
in a case where the first mode is selected through operation to the switching part,
when the trigger is operated, drive the electric motor at a prestart voltage until the hammer is brought into contact with the anvil in a rotational direction of the hammer, the prestart voltage being restricted to a predetermined upper limit irrespective of the selected stroke of the trigger,
after the hammer is brought into contact with the anvil, drive the electric motor at a voltage higher than the prestart voltage, the higher voltage being based on the selected stroke of the trigger, and
when an electric current supplied to the electric motor exceeds a target current, halt driving of the electric motor; and
in a case where the second mode is selected through the operation to the switching part,
when the trigger is operated, the control unit omits application of the prestart voltage to the motor and drives the electric motor at the higher voltage based upon the selected stroke of the trigger.
4. The electric power tool according to claim 3, wherein the control unit is further configured to perform a soft start operation after driving the electric motor at the voltage higher than the prestart voltage.

\* \* \* \* \*